US012288493B2

(12) United States Patent
Sone et al.

(10) Patent No.: US 12,288,493 B2
(45) Date of Patent: Apr. 29, 2025

(54) INFORMATION PROCESSING APPARATUS WITH TWO DISPLAY MODES AND CONTROL METHOD THEREOF

(71) Applicant: Lenovo (Singapore) Pte. Ltd., Singapore (SG)

(72) Inventors: Yuichi Sone, Kanagawa (JP); Yoshinori Ito, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/428,337

(22) Filed: Jan. 31, 2024

(65) Prior Publication Data

US 2024/0282230 A1 Aug. 22, 2024

(30) Foreign Application Priority Data

Feb. 21, 2023 (JP) ................................ 2023-025177

(51) Int. Cl.
*G09G 3/00* (2006.01)

(52) U.S. Cl.
CPC ..... *G09G 3/035* (2020.08); *G09G 2320/0606* (2013.01); *G09G 2320/08* (2013.01); *G09G 2354/00* (2013.01)

(58) Field of Classification Search
CPC .......... G09G 3/035; G09G 2320/0606; G09G 2320/08; G09G 2354/00; G06F 2203/04803; G06F 3/04886; G06F 1/1618; G06F 9/44
See application file for complete search history.

(56) References Cited

U.S. PATENT DOCUMENTS

2014/0331175 A1* 11/2014 Mesguich Havilio ...................... G06F 3/0481 715/863
2019/0102075 A1* 4/2019 Naidoo ................ G06F 40/166
2023/0297308 A1* 9/2023 Matsumura ......... G06F 3/04883 345/156

FOREIGN PATENT DOCUMENTS

JP 2014026588 A 2/2014
JP 2018013850 A 1/2018
JP 2018124735 A 8/2018
WO 2020170461 A1 8/2020
WO 2022049794 A1 3/2022

* cited by examiner

*Primary Examiner* — Rodney Amadiz
(74) *Attorney, Agent, or Firm* — Osha Bergman Watanabe & Burton LLP

(57) ABSTRACT

An information processing apparatus includes a display, a memory that stores display data to be displayed on the display, and a processor that controls the stored display data. The processor is configured to switch the display between a first display mode in which an entire screen area of the display is used as a display area and a second display mode in which the entire screen area is divided into a plurality of areas, to select a screen on which any display mode of the first display mode and the second display mode is selectable by an operation of a user, and to control the selection screen to be hidden after a predetermined time elapses since the operation of the user to select the display mode is performed on the selection screen, and to change a setting of the predetermined time based on a predetermined condition.

10 Claims, 10 Drawing Sheets

INFORMATION PROCESSING APPARATUS WITH TWO DISPLAY MODES AND CONTROL METHOD THEREOF

CROSS-REFERENCE TO RELATED APPLICATIONS

This application claims priority to Japanese Patent Application No. 2023-025177 filed on Feb. 21, 2023, the contents of which are hereby incorporated herein by reference in their entirety.

BACKGROUND OF THE INVENTION

Field of the Invention

The present invention relates to an information processing apparatus and a control method.

Description of the Related Art

In recent years, an information processing apparatus in which a foldable flexible display (display unit) is provided over a first chassis and a second chassis to be bendable according to rotational movement of the first chassis and the second chassis is disclosed (see, for example, Japanese Unexamined Patent Application Publication No. 2018-13850). In a case in which one display is provided over the first chassis and the second chassis, in addition to the use of one display in a one-screen mode, one display can also be divided into a screen area on the first chassis side and a screen area on the second chassis side and used in a two-screen mode in a pseudo manner.

In addition, in the two-screen mode, there is a mode in which it is possible to switch display of each screen area (that is, switch between a primary screen and a secondary screen). As described above, in a case in which the display modes are switched, such as a case in which the one-screen mode and the two-screen mode are switched or a case in which the primary screen and the secondary screen are switched in the two-screen mode, a user can select the display mode by displaying a selection screen on which the display mode is selectable, on the display such as a pop-up screen.

In a case in which an operation of selecting the display mode on the selection screen (for example, the pop-up screen) on which the display mode is selectable is performed by the user, the selection screen is switched to the selected display mode, and is closed and hidden. In this case, since the selection screen is closed immediately in response to the user operating the selection screen, there is not enough time to reselect the display mode after the user selects the display mode. However, there is a case in which the user changes his or her mind after the selection and wants to select another display mode or a case in which a wrong display mode is selected. In this case, since it is necessary to perform an operation of displaying the selection screen again, it takes time and effort and the operability is not good.

The present invention has been made in view of the above circumstances, and an object of the present invention is to provide an information processing apparatus and a control method for improving the operability when display modes of a display are switched.

SUMMARY OF THE INVENTION

A first aspect of the present invention relates to an information processing apparatus including: a display; a memory configured to temporarily store display data to be displayed on the display; and a processor configured to perform control when the display data stored in the memory is displayed on the display, in which the processor is configured to perform a display mode switching process of switching between a first display mode in which display is controlled by using an entire screen area of the display as a display area, and a second display mode in which display is controlled by dividing the screen area into a plurality of areas, a selection screen control process of displaying, on the display, a selection screen on which any display mode of the first display mode and the second display mode is selectable by an operation of a user, and controlling the selection screen to be hidden, after a predetermined time elapses since the operation of the user to select the display mode is performed on the selection screen, and a display time setting process of changing a setting of the predetermined time based on a predetermined condition.

In the information processing apparatus, the processor may be configured to: in the display time setting process, display, on the display, a setting screen on which the predetermined time is settable by the user, and change the setting of the predetermined time by using, as the predetermined condition, a fact that the setting of the predetermined time is changed based on an operation of the user on the setting screen.

In the information processing apparatus, the processor may be configured to: in the display time setting process, change the setting of the predetermined time by using, as the predetermined condition, a condition based on an operation history for each user on the selection screen.

In the information processing apparatus, the processor may be configured to: in the display time setting process, change the setting of the predetermined time by using a trained model subjected to machine learning based on the operation history for each user on the selection screen.

In the information processing apparatus, the processor may be configured to: in the display time setting process, change the setting of the predetermined time by using, as the predetermined condition, a condition based on a time zone.

In the information processing apparatus, the processor may be configured to: in the display time setting process, change the setting of the predetermined time by using a trained model subjected to machine learning based on the time zone and an operation history of the user on the selection screen.

In the information processing apparatus, the processor may be configured to: in the display time setting process, change the setting of the predetermined time by using, as the predetermined condition, a condition based on a type of an application being used.

In the information processing apparatus, the processor may be configured to: in the display time setting process, change the setting of the predetermined time by using a trained model subjected to machine learning based on the type of the application being used and an operation history of the user on the selection screen.

In the information processing apparatus, the processor may be configured to: in the display time setting process, display, on the display, information for prompting to change the predetermined time based on the predetermined condition, and display, on the display, a setting screen on which the predetermined time is settable by the user based on an operation of the user; and change the setting of the predetermined time by using, as the predetermined condition, a fact that the setting of the predetermined time is changed based on the operation of the user on the setting screen.

In the information processing apparatus, the processor may be configured to: in the display mode switching process, in the second display mode, control display by dividing the screen area of the display into two display areas, a first screen area and a second screen area, and perform switching even to a display mode in which display data to be displayed in the first screen area and display data to be displayed in the second screen area are switched.

In addition, a second aspect of the present invention relates to a control method in an information processing apparatus including a display, a memory configured to temporarily store display data to be displayed on the display, and a processor configured to perform control when the display data stored in the memory is displayed on the display, the control method including: causing the processor to perform a step of switching between a first display mode in which display is controlled by using an entire screen area of the display as a display area and a second display mode in which display is controlled by dividing the screen area into a plurality of areas, a step of displaying, on the display, a selection screen on which any display mode of the first display mode and the second display mode is selectable by an operation of a user, a step of controlling the selection screen to be hidden, after a predetermined time elapses since the operation of the user to select the display mode is performed on the selection screen, and a step of changing a setting of the predetermined time based on a predetermined condition.

The above-described aspects of the present invention can improve the operability when the display modes of the display are switched.

DETAILED DESCRIPTION OF THE INVENTION

Hereinafter, embodiments of the present invention will be described with reference to the accompanying drawings.

First Embodiment

First, a first embodiment will be described.

Figure 1:
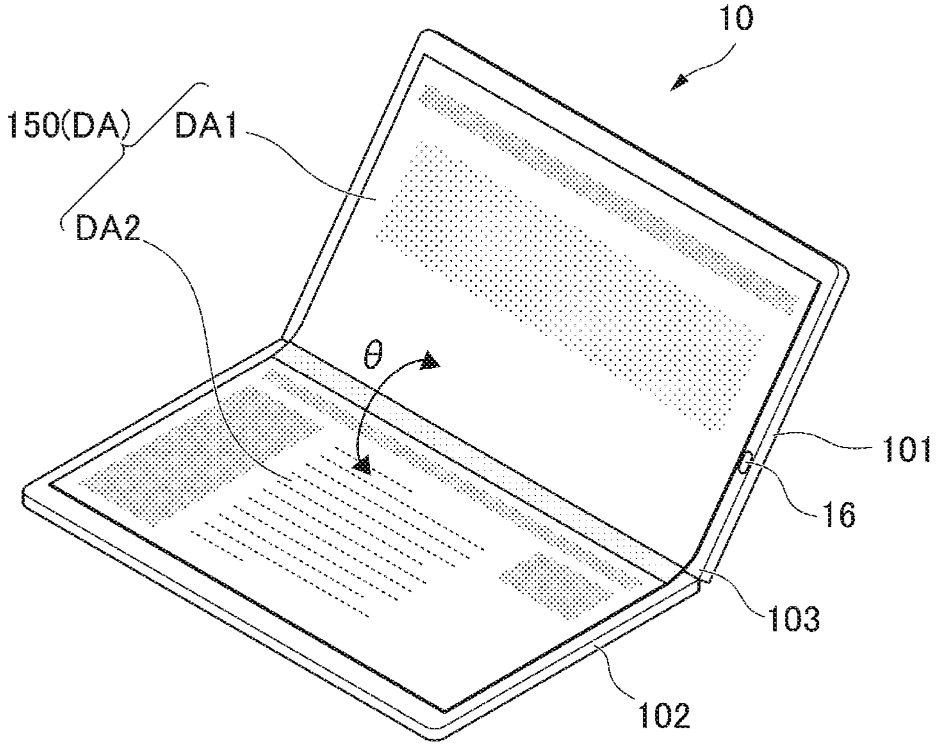
FIG. 1 is a perspective view illustrating an appearance of an information processing apparatus according to a first embodiment.

FIG. 1 is a perspective view illustrating an appearance of an information processing apparatus 10 according to the present embodiment. The information processing apparatus 10 according to the present embodiment is a clamshell (laptop) personal computer (PC). The information processing apparatus 10 is provided with a first chassis 101, a second chassis 102, and a hinge mechanism 103. The first chassis 101 and the second chassis 102 are chassis having a substantially quadrangular plate shape (for example, flat plate shape). One of side surfaces of the first chassis 101 and one of side surfaces of the second chassis 102 are coupled (connected) via the hinge mechanism 103, and the first chassis 101 and the second chassis 102 can relatively move rotationally around a rotation axis formed by the hinge mechanism 103. A state in which an opening angle θ around the rotation axis of the first chassis 101 and the second chassis 102 is about 0 degrees is a state in which the first chassis 101 and the second chassis 102 overlap each other and are closed. A state in which the first chassis 101 and the second chassis 102 are closed will be referred to as a "closed state (closed)". In the closed state, surfaces of the first chassis 101 and the second chassis 102 facing each other will be referred to as "inner surfaces", and surfaces opposite to the inner surfaces will be referred to as "outer surfaces". The opening angle θ can also be referred to as an angle formed by the inner surface of the first chassis 101 and the inner surface of the second chassis 102. A state in which the first chassis 101 and the second chassis 102 are opened with respect to the closed state will be referred to as an "open state". The open state is a state in which the first chassis 101 and the second chassis 102 are relatively moved rotationally until the opening angle θ exceeds a preset threshold value (for example, 10 degrees).

The information processing apparatus 10 is provided with a camera 16 and a display 150. The camera 16 is provided on the inner surface of the first chassis 101. The display 150 is provided over the inner surface of the first chassis 101 and the inner surface of the second chassis 102. The camera 16 is provided in, for example, an outer portion of a screen area of the display 150 on the inner surface of the first chassis 101, and can image a user or the like who exists on the side facing the display 150. The display 150 is a flexible display that can be bent according to the opening angle θ due to the relative rotational movement of the first chassis 101 and the second chassis 102 (see FIGS. 2 and 3). An organic EL display or the like is used as the flexible display. The information processing apparatus 10 can control display of an entire screen area of the display 150 as one screen area DA in a one-screen configuration, and can also control display by dividing the entire screen area of the display 150 into two screen areas, a first screen area DA1 and a second screen area DA2, in a two-screen configuration. Here, the first screen area DA1 and the second screen area DA2 are the screen areas that do not overlap each other. Here, among the screen areas of the display 150, a screen area corresponding to the inner surface side of the first chassis 101 is defined as the first screen area DA1, and a screen area corresponding to the inner surface side of the second chassis 102 is defined as the second screen area DA2. In the following description, a display mode in which display is controlled with the one-screen configuration will be referred to as a "one-screen mode", and a display mode in which display is controlled with the two-screen configuration will be referred to as a "two-screen mode".

It should be noted that a touch sensor is provided on the screen area of the display 150. The information processing apparatus 10 can detect a touch operation on the screen area of the display 150. By bringing the information processing apparatus 10 into an open state (in general, the opening angle θ=about 90 degrees to 180 degrees), the user can visually recognize display of the display 150 provided on the inner surface of each of the first chassis 101 and the second chassis 102, or can perform the touch operation on the display 150, and thus can use the information processing apparatus 10.

Hereinafter, a use form and the screen mode of the information processing apparatus 10 will be described in detail. First, the use forms of the information processing apparatus 10 are classified into a state (bent form) in which the first chassis 101 and the second chassis 102 are bent according to the opening angle θ between the first chassis 101 and the second chassis 102, and a flat state (flat form) in which the first chassis 101 and the second chassis 102 are not bent. In the following description, the state (bent form) in which the first chassis 101 and the second chassis 102 are bent will be simply referred to as a "bent state (bent form)", and the flat state (flat form) in which the first chassis 101 and the second chassis 102 are not bent will be simply referred to as a "flat state (flat form)". In the bent state (bent form), the display 150 provided over the first chassis 101 and the second chassis 102 is also in the bent state. In the flat state (flat form), the display 150 is also in the flat state.

Figure 2:
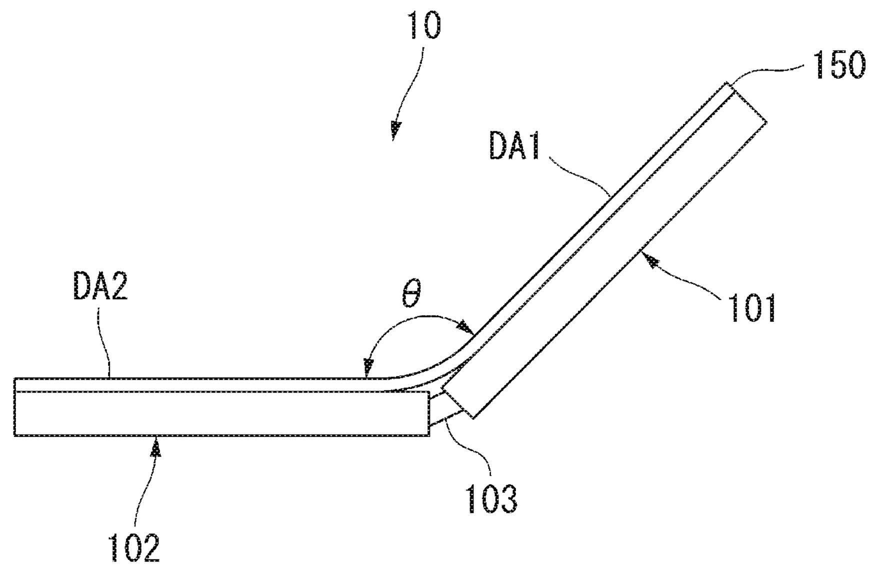
FIG. 2 is a side view illustrating an example of the information processing apparatus in a bent state according to the first embodiment.

FIG. 2 is a side view illustrating an example of the information processing apparatus 10 in the bent state (bent form). The display 150 is arranged over (across) the first chassis 101 and the second chassis 102. The screen area (screen area DA illustrated in FIG. 1) of the display 150 can be bent with a portion corresponding to the hinge mechanism 103 as a crease, and is divided into two screen areas according to the crease portion. Here, the screen area on the first chassis 101 side is illustrated as the first screen area DA1 and the screen area on the second chassis 102 side is illustrated as the second screen area DA2 with the crease portion as a boundary. The display 150 is bent according to the rotational movement (opening angle θ) of the first chassis 101 and the second chassis 102. It is determined whether or not the information processing apparatus 10 is in the bent state (bent form) according to the opening angle θ. As an example, in a case in which 10 degrees <θ<170 degrees, it is determined that the information processing apparatus 10 is in the bent state (bent form). This state corresponds to the use form such as a so-called clamshell mode or book mode.

Figure 3:
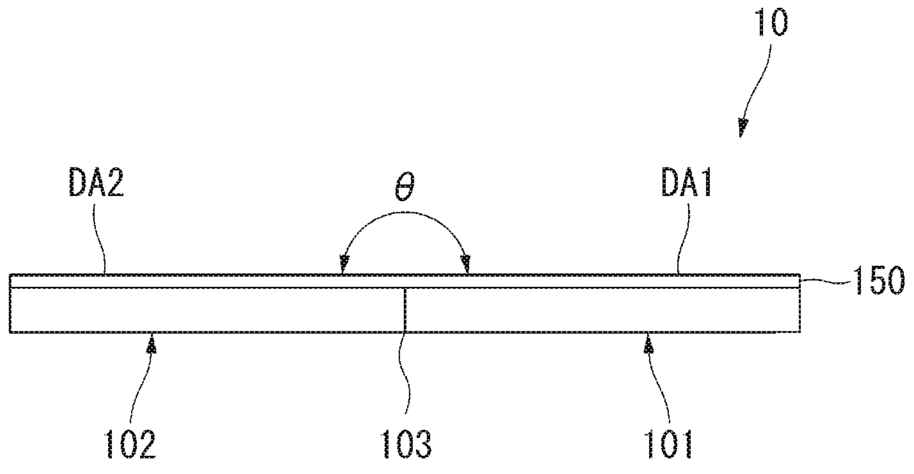
FIG. 3 is a side view illustrating an example of the information processing apparatus in a flat state according to the first embodiment.

FIG. 3 is a side view illustrating an example of the information processing apparatus 10 in the flat state (flat form). It is typically determined that the information processing apparatus 10 is in the flat state (flat form) in a case in which the opening angle θ is 180 degrees, but as an example, it may be determined that the information processing apparatus 10 is in the flat state (flat form) in a case in which 170 degrees≤θ≤180 degrees. For example, in a case in which the opening angle θ between the first chassis 101 and the second chassis 102 is 180 degrees, the display 150 is also in the flat state. This state corresponds to the use form called a so-called tablet mode.

Hereinafter, the display modes according to various use forms of the information processing apparatus 10 will be described in detail with reference to FIG. 4.

Figure 4:
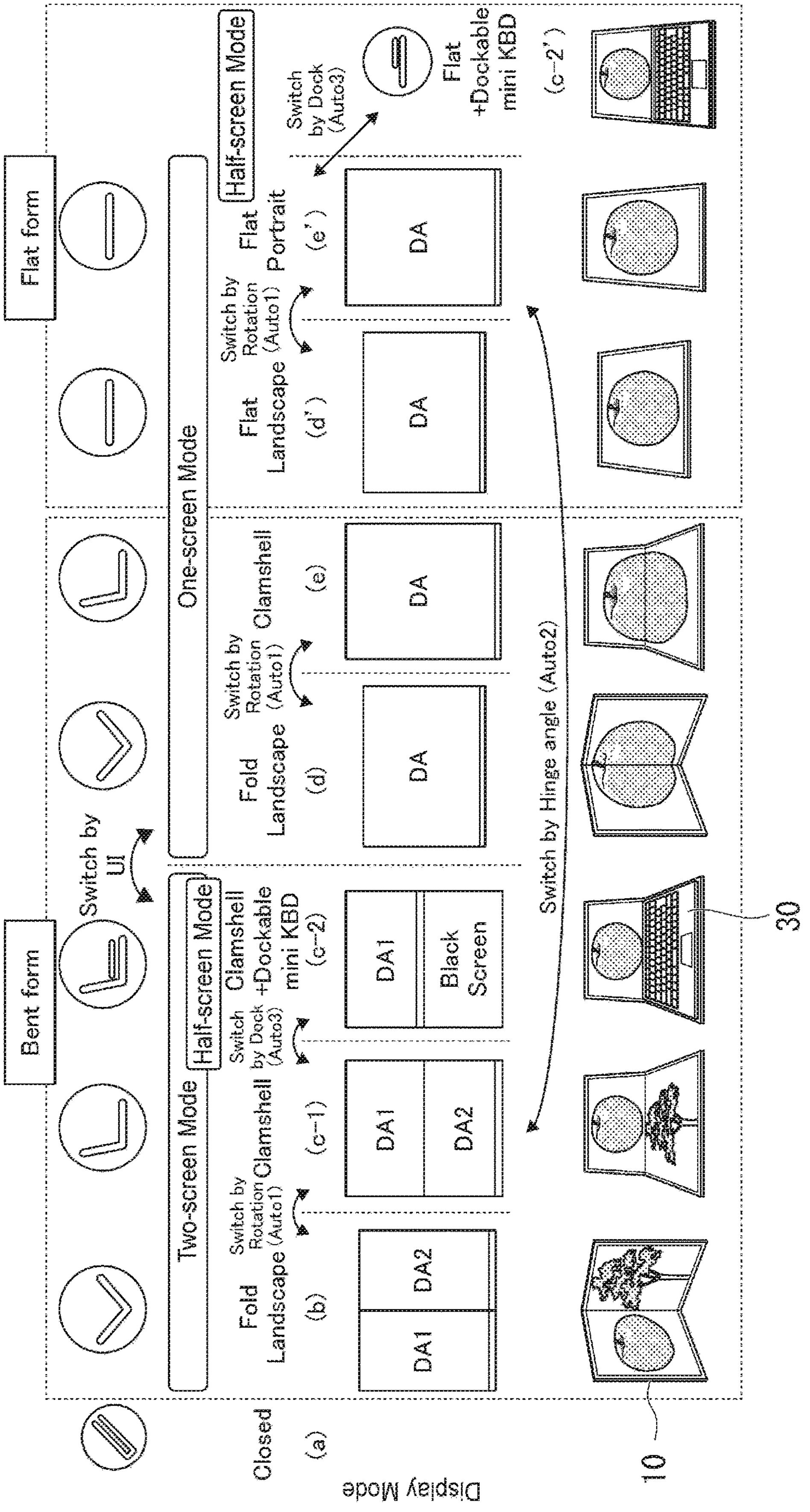
FIG. 4 is a diagram illustrating specific examples of various display modes of the information processing apparatus according to the first embodiment.

FIG. 4 is a diagram illustrating specific examples of various display modes of the information processing apparatus 10 according to the present embodiment. The information processing apparatus 10 has different display modes according to the use forms classified according to the opening angle θ between the first chassis 101 and the second chassis 102, an attitude (orientation) of the information processing apparatus 10, whether the one-screen mode is used or the two-screen mode is used, and the like. It should be noted that the one-screen will also be called a single screen, and the two-screen will also be called a split screen, a dual screen, or the like.

A display mode (a) is a display mode when the first chassis 101 and the second chassis 102 are in the closed state (Closed) as the use form. In this closed state, the information processing apparatus 10 is, for example, in a standby state such as a sleep or hibernation state (hibernation), and the display 150 is in a display-off state. The standby state such as the sleep or hibernation state (hibernation) corresponds to S3 or S4 of a power supply state of a system defined by, for example, an advanced configuration and power interface (ACPI).

A display mode (b) is a display mode when the use form is the bent state (bent form), and the two-screen mode is used in which display is controlled such that the screen area of the display 150 is divided into the two screen areas, the first screen area DA1 and the second screen area DA2. The orientation of the information processing apparatus 10 is an orientation in which the first screen area DA1 and the second screen area DA2 are in a vertical orientation and are horizontally arranged from side to side. The vertical orientation of the screen area is an orientation in which a long side of four sides of a rectangular screen area is in a vertical direction and a short side is in a horizontal direction. In a case in which the screen area is in the vertical orientation, a display orientation is also the vertical orientation, and display is performed in an orientation in which a direction along the long side corresponds to an up-down direction and a direction along the short side corresponds to a left-right direction. This use form is a use form in which left and right pages when a book is opened correspond to left and right screens, and corresponds to the so-called book mode. This use form will also be referred to as a "Fold Landscape" because the use form is the bent state (bent form), the first screen area DA1 and the second screen area DA2 are arranged side by side, and the screen area obtained by combining the first screen area DA1 and the second screen area DA2 is horizontally long.

In this display mode (b), for example, in a normal operation state, the information processing apparatus 10 is in the two-screen display mode in which the first screen area DA1 on the left side is used as a primary screen and the second screen area DA2 on the right side is used as a secondary screen. It should be noted that, in the display mode (b), a correspondence relationship between the first screen area DA1 and the second screen area DA2, and the primary screen and the secondary screen may be reversed.

As in the display mode (b), a display mode (c-1) is a display mode when the use form is the bent state (bent form), and the two-screen mode is used in which display is controlled by dividing the screen area of the display 150 into two screen areas, the first screen area DA1 and the second screen area DA2, but an orientation of the information processing apparatus 10 is different. The orientation of the information processing apparatus 10 is an orientation in which the first screen area DA1 and the second screen area DA2 are in a horizontal orientation and are vertically arranged up and down. The horizontal orientation of the screen area is an orientation in which a long side of four sides of a rectangular screen area is in a horizontal direction and a short side is in a vertical direction. In a case in which the screen area is in the horizontal orientation, a display orientation is also the horizontal orientation, and display is performed in an orientation in which a direction along the short side corresponds to an up-down direction and a direction along the long side corresponds to a left-right direction. This use form is one of general use forms of a clamshell PC.

In this display mode (c-1), for example, in a normal operation state, the information processing apparatus 10 is in the two-screen display mode in which the first screen area DA1 is used as a primary screen and the second screen area DA2 is used as a secondary screen. It should be noted that, in the display mode (c-1), a correspondence relationship between the first screen area DA1 and the second screen area DA2, and the primary screen and the secondary screen may be reversed.

For example, the information processing apparatus 10 detects a change in the attitude (orientation) of the information processing apparatus 10, and thus automatically performs switching from the display mode (b) to the display mode (c-1) or from the display mode (c-1) to the display mode (b) (Switch by Rotation). For example, since the display mode (c-1) is a state in which the display 150 is rotated 90 degrees rightward with respect to the display mode (b) as illustrated, when the rightward rotation from a state of the display mode (b) by a predetermined angle (for example, 45 degrees) or more is detected, the information processing apparatus 10 performs the switching to the display mode (c-1). Since the display mode (b) is a state in which the display 150 is rotated 90 degrees leftward with respect to the display mode (c-1) as illustrated, when the leftward rotation from a state of the display mode (c-1) by a predetermined angle (for example, 45 degrees) or more is detected, the information processing apparatus 10 performs the switching to the display mode (b).

As in the display mode (c-1), in a display mode (c-2), the bent state (bent form) is used and the orientation of the information processing apparatus 10 is the same, but there is a difference in that an external keyboard 30 (Dockable mini Keyboard (KBD)) that can be placed on the information processing apparatus 10 is placed at a predetermined position. This use form is a state in which the physical keyboard 30 is connected in a general use form of a clamshell PC. For example, in the present embodiment, the keyboard 30 has almost the same size as the second screen area DA2, and can be placed on the second screen area DA2. It should be noted that the keyboard 30 may be a keyboard that occupies a smaller area than the second screen area DA2. As an example, the keyboard 30 is provided with a magnet in an inner portion (end portion) of a bottom surface, and when the keyboard 30 is placed on the second screen area DA2, the keyboard 30 is attracted and fixed to a bezel portion of an end portion on the inner surface of the second chassis 102. As a result, the use form is the same as the use form of a conventional clamshell PC that is originally provided with the physical keyboard. In addition, the information processing apparatus 10 and the keyboard 30 are connected by, for example, Bluetooth (registered trademark). In this display mode (c-2), the information processing apparatus 10 controls the second screen area DA2 to be displayed black or turned off because the second screen area DA2 cannot be visually recognized due to the keyboard 30. In other words, this display mode (c-2) is a display mode (hereinafter, referred to as a "half-screen mode") in which only half screen area of the screen area DA of the display 150 is valid for display and is only the first screen area DA1 is the display area. That is, the half-screen mode is a display mode in which display is controlled by using, as the display area, a partial screen area (first screen area DA1) excluding the screen area (second screen area DA2) on the side of the screen area (screen area DA) of the display 150 on which the keyboard 30 is placed.

For example, when the information processing apparatus 10 detects the connection with the external keyboard 30 in a state of the display mode (c-1), the information processing apparatus 10 automatically performs the switching from the display mode (c-1) to the display mode (c-2) (Switch by Dock).

As in the display mode (b), in a display mode (d), the bent state (bent form) is used and the orientation of the information processing apparatus 10 is the same, but there is a difference in that the display mode (d) is the one-screen mode in which display is controlled by using the entire screen area of the display 150 is used as one screen area DA. This use form is different from the display mode (b) in that the one-screen mode is used, but will also be referred to as the "Fold Landscape" because the bent state (bent form) is used and the screen area DA is horizontally long. The screen area DA is in the horizontal orientation, and the display orientation is also the horizontal orientation.

Here, the switching between the one-screen mode and the two-screen mode in the bent state (bent form) is performed, for example, by the operation of the user. For example, the information processing apparatus 10 displays an operator as a user interface (UI) that can switch between the one-screen mode and the two-screen mode at any place on the screen, and performs the switching from the display mode (b) to the display mode (d) based on an operation on the operator (Switch by UI). Specific examples of this display mode switching operation will be described below.

As in the display mode (c-1), in a display mode (e), the bent state (bent form) is used and the orientation of the information processing apparatus 10 is the same, but there is a difference in that the display mode (d) is the one-screen mode in which display is controlled by using the entire screen area of the display 150 is used as one screen area DA. This use form is different from the display mode (c-1) in that the one-screen mode is used, but corresponds to the use form of the clamshell PC in terms of the bent state (bent form) and the orientation of the information processing apparatus 10. The screen area DA is in the vertical orientation, and the display orientation is also the vertical orientation.

For example, the information processing apparatus 10 detects a change in the attitude (orientation) of the information processing apparatus 10, and thus automatically performs switching from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when the rightward rotation from a state of the display mode (d) by a predetermined angle (for example, 45 degrees) or more is detected, the information processing apparatus 10 performs the switching to the display mode (e). Since the display mode (d) is a state in which the display 150 is rotated 90 degrees leftward with respect to the display mode (e) as illustrated, when the leftward rotation from a state of the display mode (e) by a predetermined angle (for example, 45 degrees) or more is detected, the information processing apparatus 10 performs the switching to the display mode (d).

As in the display mode (d), in a display mode (d'), the one-screen mode is used and the orientation of the information processing apparatus 10 is an orientation in which the screen area DA is horizontally long, but there is a difference in that the flat state (flat form) is used. The flat state (flat form) is a state in which the opening angle θ between the first chassis 101 and the second chassis 102 is about 180 degrees. This use form corresponds to the so-called tablet mode described with reference to FIG. 3, and will also be referred to as the "Flat Landscape" because the flat state (flat form) is used and the screen area DA is horizontally long. This display mode (d') is different from the display mode (d) only in terms of the opening angle θ between the first chassis 101 and the second chassis 102. As in the display mode (d), the screen area DA is in the horizontal orientation, and the display orientation is also the horizontal orientation.

As in the display mode (e), in a display mode (e'), the one-screen mode is used and the orientation of the information processing apparatus 10 is an orientation in which the screen area DA is vertically long, but there is a difference in that the flat state (flat form) is used. This use form will also be referred to as a "Flat Portrait" because the flat state (flat form) is used and the screen area DA is vertically long. This display mode (e') is different from the display mode (e) only in terms of the opening angle θ between the first chassis 101 and the second chassis 102. As in the display mode (e), the screen area DA is in the vertical orientation, and the display orientation is also the vertical orientation.

For example, the information processing apparatus 10 detects a change in the attitude (orientation) of the information processing apparatus 10, and thus automatically performs switching from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when the rightward rotation from a state of the display mode (d') by a predetermined angle (for example, 45 degrees) or more is detected, the information processing apparatus 10 performs the switching to the display mode (e'). Since the display mode (d') is a state in which the display 150 is rotated 90 degrees leftward with respect to the display mode (e') as illustrated, when the leftward rotation from a state of the display mode (e') by a predetermined angle (for example, 45 degrees) or more is detected, the information processing apparatus 10 performs the switching to the display mode (d').

It should be noted that, in the display mode (d') and the display mode (e'), the user can perform the operation to perform the switching to the two-screen mode while maintaining the flat state (flat form). For example, when the switching from a state of the display mode (d') to the two-screen mode is performed, the display state is the same as the display state of the display mode (b) in the flat state (flat form). When the switching from a state of the display mode (e') to the two-screen mode is performed, the display state is the same as the display state of the display mode (c-1) in the flat state (flat form).

When the information processing apparatus 10 detects the connection with the keyboard 30 in a state of the display mode (e'), the information processing apparatus 10 automatically performs the switching from the display mode (e') to the display mode (c-2') (Switch by Dock). The display mode (c-2') is the flat state (flat form), and is different from the display mode (c-2) only in terms of the opening angle θ between the first chassis 101 and the second chassis 102. In this display mode (c-2'), the information processing apparatus 10 controls the second screen area DA2 to be displayed black or turned off because the second screen area DA2 cannot be visually recognized due to the keyboard 30. In other words, as in the display mode (c-2), this display mode (c-2') is a half-screen mode in which only half screen area (first screen area DA1) of the screen area DA of the display 150 is valid for display.

The information processing apparatus 10 can be configured to perform the switching from the one-screen mode to the two-screen mode in a case in which the change from the flat state (flat form) to the bent state (bent form) is detected. For example, in a case in which the change to the bent state (bent form) in a state of the display mode (d') is detected based on the opening angle θ between the first chassis 101 and the second chassis 102, the information processing apparatus 10 automatically performs the switching from the display mode (d') to the display mode (b). In a case in which the change to the bent state (bent form) in a state of the display mode (e') is detected based on the opening angle θ between the first chassis 101 and the second chassis 102, the information processing apparatus 10 automatically performs the switching from the display mode (e') to the display mode (c-1).

(Display Mode Switching Operation)

Figure 5A:
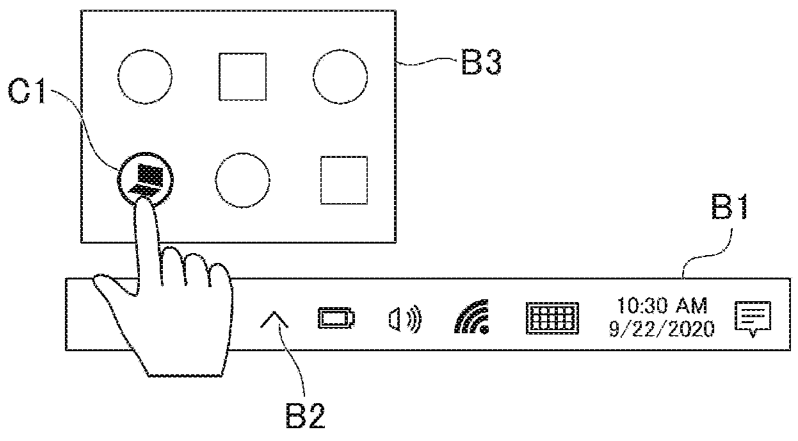
FIGS. 5A-5C are diagrams illustrating an example of an operation specification of a display mode switching operation according to the first embodiment.
Figure 5B:
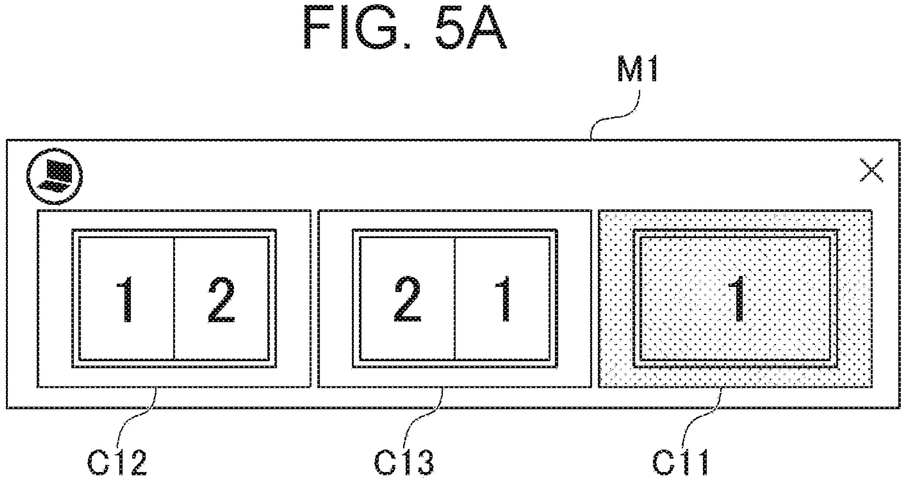
Figure 5C:
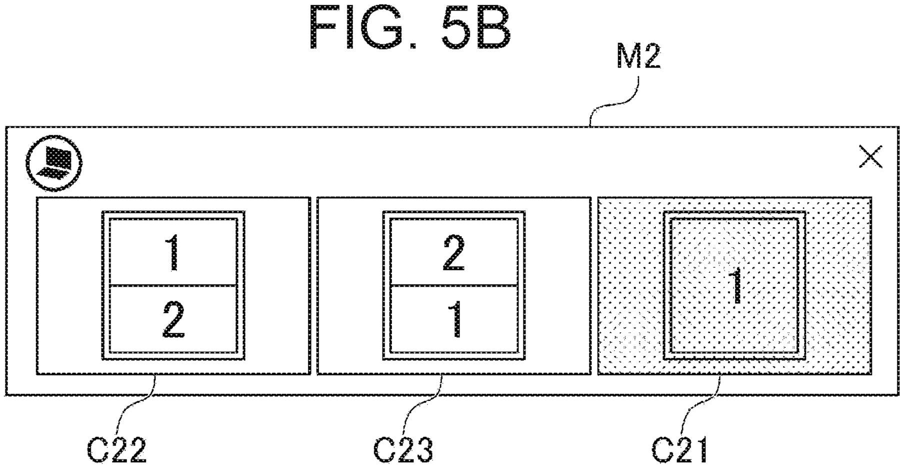

Hereinafter, a specific example of an operation specification when the display modes are switched by the operation of the user will be described. FIGS. 5A-5C are diagrams illustrating an example of the operation specification of the display mode switching operation according to the present embodiment. For example, the display mode switching operation is an operation on an icon C1 of an application for executing a display mode switching function. In the example illustrated in FIG. 5A, for example, on a desktop screen of Windows (registered trademark), the icon C1 is displayed in a task tray B3 (system tray) displayed in response to an operation of a button B2 displayed on a task bar B1. The button B2 is displayed as an operator for displaying a hidden indicator (icon of the application).

The task bar B1 is displayed on any of the screen areas DA of the display 150. For example, the task bar B1 is displayed only at one location (for example, the bottommost part of the screen area DA) in the screen area DA of the display 150 regardless of whether the one-screen mode is used or the two-screen mode is used. It should be noted that, in a case of the two-screen mode, the task bar B1 may be displayed in each of the first screen area DA1 and the second screen area DA2 (for example, in each bottommost part).

In a case in which the user operates the icon C1, a display mode selection screen in which the display mode is selectable is displayed as a pop-up screen. It should be noted that the display mode selection screen may be displayed as the pop-up screen when the bent state (bent form) is changed to the flat state (flat form) in which the first chassis 101 and the second chassis 102 are not bent. In addition, the display mode selection screen may be displayed as the pop-up screen when the flat state (flat form) is changed to the bent state (bent form).

On the display mode selection screen, a display mode selection icon that is an option of each display mode is displayed such that each display mode can be selected. For example, on the display mode selection screen, the display mode selection icons that are the options of the display mode selectable by the user are displayed according to the use form (orientation of the display 150) in this case. In a case in which the user performs the operation of selecting the display mode selection icon, the one-screen mode and the two-screen mode can be switched or the display data to be displayed in the first screen area DA1 and the second screen area DA2 in the two-screen mode can be switched (the primary screen and the secondary screen can be switched). FIGS. 5B-5C are specific examples of the display mode selection screen.

FIG. 5B illustrates an example of a display mode selection screen M1 (pop-up screen) displayed when the use form is the "Fold Landscape" (display mode (b), display mode (d), display mode (d'), or the like). It should be noted that, in the drawing, "1" indicates the primary screen, and "2" indicates the secondary screen. A display mode selection icon C11, a display mode selection icon C12, and a display mode selection icon C13 are displayed on the display mode selection screen M1. The display mode selection icon C11 is displayed as an operator for selecting the one-screen mode (display mode (d) and display mode (d')). The display mode selection icon C12 is displayed as an operator for selecting the display mode in which the first screen area DA1 is the primary screen and the second screen area DA2 is the secondary screen in the two-screen mode (display mode (b)). The display mode selection icon C13 is displayed as an operator for selecting the display mode in which the second screen area DA2 is the primary screen and the first screen area DA1 is the secondary screen in the two-screen mode (display mode (b)). In the following description, in a case in which the two-screen mode in which the second screen area DA2 is the primary screen and the first screen area DA1 is the secondary screen is described in a distinguishable manner from the two-screen mode in which the first screen area DA1 is the primary screen and the second screen area DA2 is the secondary screen, the two-screen mode in which the second screen area DA2 is the primary screen and the first screen area DA1 is the secondary screen will be referred to as an "inverted two-screen mode".

It should be noted that the display mode selection icon corresponding to the current display mode is displayed in a display aspect that is distinguishable from other display mode selection icons. For example, the display mode selection icons C12 and C13 are highlighted or displayed in different colors so that it can be seen that the display mode selection icon C11 is the current display mode.

FIG. 5C illustrates an example of a display mode selection screen M2 (pop-up screen) displayed when the use form is "Clamshell" (display mode (c-1), display mode (e), display mode (e'), and the like). A display mode selection icon C21, a display mode selection icon C22, and a display mode selection icon C23 are displayed on the display mode selection screen M2. The display mode selection icon C21 is displayed as an operator for selecting the one-screen mode (display mode (e) and display mode (e')). The display mode selection icon C22 is displayed as an operator for selecting the display mode in which the first screen area DA1 is the primary screen and the second screen area DA2 is the secondary screen in the two-screen mode (display mode (c-1)). The display mode selection icon C23 is displayed as an operator for selecting the display mode (that is, the inverted two-screen mode) in which the second screen area DA2 is the primary screen and the first screen area DA1 is the secondary screen in the two-screen mode (display mode (c-1)).

It should be noted that, similar to the display mode selection screen M1 illustrated in FIG. 5B, the display mode selection icon corresponding to the current display mode is displayed in a display aspect that is distinguishable from other display mode selection icons. For example, the display mode selection icons C22 and C23 are highlighted or displayed in different colors so that it can be seen that the display mode selection icon C21 is the current display mode.

It should be noted that the UI for switching between the one-screen mode and the two-screen mode is not limited to the example illustrated in FIGS. 5A-5C, and any UI can be used. For example, a display mode selection icon for alternately switching between the one-screen mode and the two-screen mode each time the operation is performed, or a display mode selection icon for switching between the one-screen mode, the two-screen mode, and the inverted two-screen mode in order each time the operation is performed may be displayed.

The task tray B3 is displayed in a case in which the user operates the button B2 displayed on the task bar B1, and the display mode selection screen M1 or the display mode selection screen M2 (pop-up screen) are opened and displayed in a case in which the user further operates the icon C1 in the task tray B3. Then, the user can perform the switching to the selected display mode by selecting any of the display mode selection icons displayed on the display mode selection screen M1 and the display mode selection screen M2.

Further, in a case in which the user performs the operation of selecting any of the display mode selection icons, the display mode selection screen (pop-up screen) is closed and hidden. In the related art, since the display mode selection screen is closed immediately (for example, within about 0.5 seconds) in response to the selection of the display mode selection icon, there is no time to reselect after the selection. Therefore, in a case in which the user changes his or her mind after the selection and wants to select another display mode or a case in which a wrong display mode is selected, the user cannot reselect the display mode unless the user performs the operation on the button B2 and then performs the operation on the icon C1 in the task tray B3 to display the display mode selection screen M1 or the display mode selection screen M2 as described above.

Therefore, the information processing apparatus 10 according to the present embodiment can change a time until the display mode selection screen is controlled to be hidden since the operation of selecting the display mode is performed on the display mode selection screen. For example, the user can change the time until the display mode selection screen is controlled to be hidden since the operation of selecting the display mode is performed on the display mode selection screen.

Figures 6A, 6B:
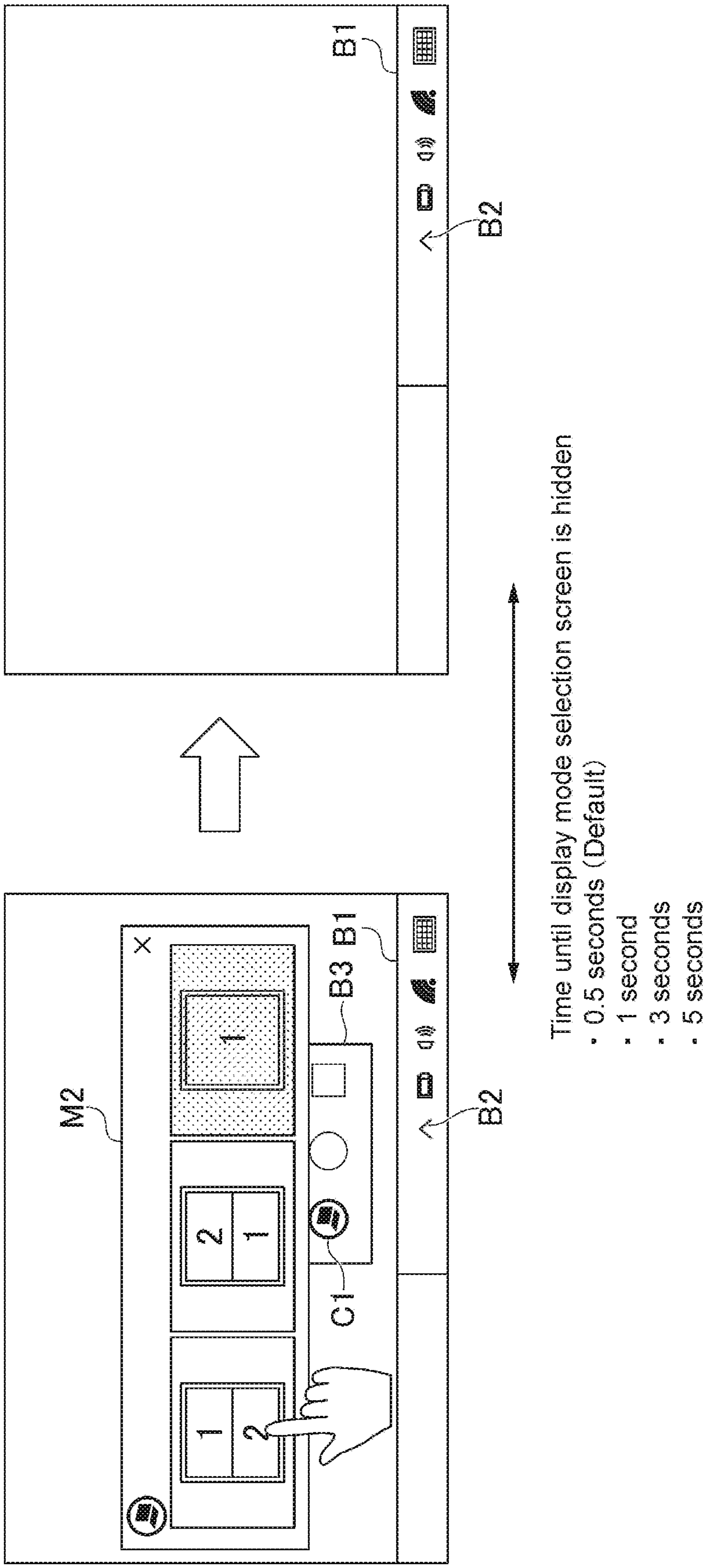
FIGS. 6A-6B are diagrams illustrating an example of a time until a display mode selection screen according to the first embodiment is controlled to be hidden.

FIGS. 6A-6B are diagrams illustrating an example of the time until the display mode selection screen according to the present embodiment is controlled to be hidden. FIG. 6A illustrates a state in which the display mode selection screen M2 is displayed. As illustrated in FIG. 6B, the information processing apparatus 10 controls the display mode selection screen M2 to be closed and hidden, after a predetermined time elapses since the operation of the user to select the display mode is performed on the display mode selection screen M2. For example, the user can select the predetermined time from 0.5 seconds, 1 second, 3 seconds, and 5 seconds. It should be noted that an initial value (Default) is set to, for example, 0.5 seconds.

It should be noted that, even in a case in which the user does not select any of the display mode selection icons after a certain time (for example, 3 to 5 seconds) elapses since the display mode selection screen M1 or the display mode selection screen M2 is displayed, the information processing apparatus 10 controls the display mode selection screen to be hidden. Further, even in a case in which the user operates a close button "×" in the upper right of the display mode selection screen, the user operates an outside of the popped up display mode selection screen, or the orientation of the information processing apparatus 10 is changed, the information processing apparatus 10 controls the display mode selection screen to be hidden. It should be noted that, in a state in which the keyboard 30 is connected, the display mode selection screen is not displayed because the half-screen mode (display mode (c-2)) in which only the first screen area DA1 is valid for display is fixed.

Next, with reference to FIGS. 7 and 8, an operation specification when the user sets the time until the display mode selection screen is controlled to be hidden will be described. For example, the information processing apparatus 10 displays, on the display 150, a display time setting screen on which a display time of the display mode selection screen is settable when the user sets the time until the display mode selection screen is controlled to be hidden. Here, on the display time setting screen, a time (hereinafter, referred to as "post-display setting time") until the display mode selection screen is controlled to be hidden in a case in which there is no operation of the user since the display mode selection screen is displayed, and a time (hereinafter, referred to as "post-selection setting time") until the display mode selection screen is controlled to be hidden since the operation of selecting the display mode is performed on the display mode selection screen can be set.

Figure 7:
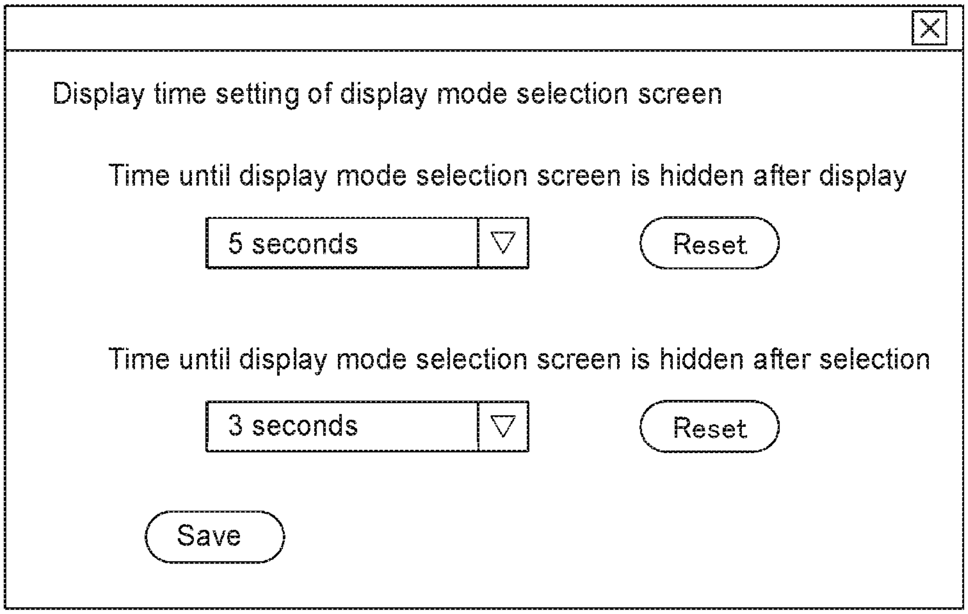
FIG. 7 is a diagram illustrating an example of a display time setting screen according to the first embodiment.

FIG. 7 is a diagram illustrating an example of the display time setting screen according to the present embodiment. In the illustrated example of the display time setting screen, each of the post-display setting time (time until the display mode selection screen is hidden after display) and the post-selection setting time (time until the display mode selection screen is hidden after the selection) can be selected from a pull-down (drop-down) list. The time until the display mode selection screen is hidden after display can be selected from among the options of, for example, 3 seconds, 5 seconds, and 8 seconds. An initial value (Default) is set to, for example, 5 seconds. In addition, the time until the display mode selection screen is hidden after the selection can be selected from among the options of, for example, 0.5 seconds, 1 second, 3 seconds, and 5 seconds.

The user can select each of the post-display setting time and the post-selection setting time by performing the operation of selecting any one of the options in a pull-down manner. It should be noted that, in a case in which the user performs an operation on "Reset", the initial value (Default) is selected. When the user performs the operation on "save" after the selection, each of the post-display setting time and the post-selection setting time, which are selected, is set.

Figure 8:
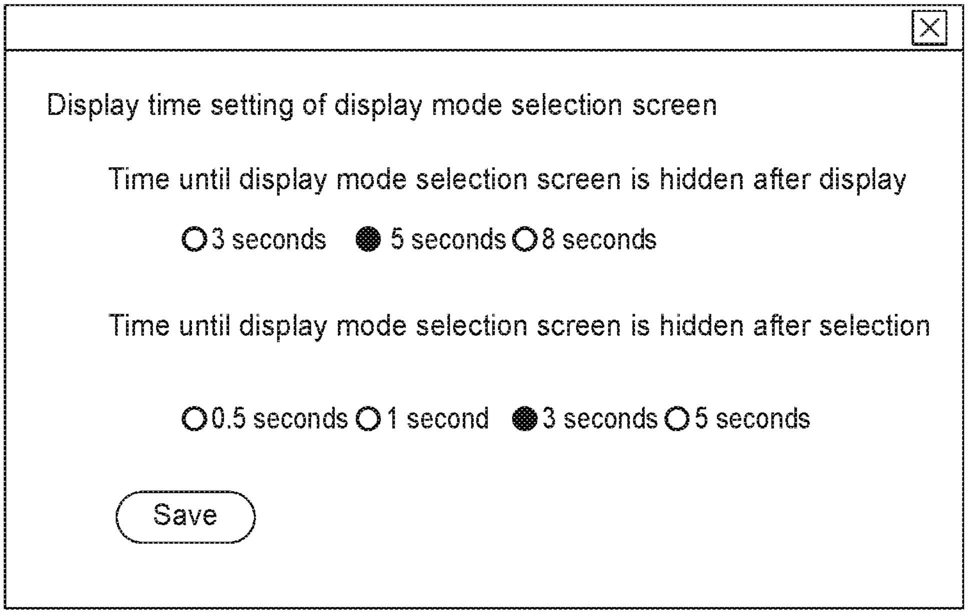
FIG. 8 is a diagram illustrating another example of the display time setting screen according to the first embodiment.

FIG. 8 is a diagram illustrating another example of the display time setting screen according to the present embodiment.

The illustrated example of the display time setting screen is an example in which the selection is performed with a radio button, instead of an example in which the selection is performed in the pull-down (drop-down) manner as illustrated in FIG. 7. The options for each of the post-display setting time and the post-selection setting time are displayed together with the radio buttons. The user can perform the selection from among the options of, for example, 3 seconds, 5 seconds, and 8 seconds by performing the operation of selecting the radio button for the post-display setting time. Similarly, the user can perform the selection from among the options of, for example, 0.5 seconds, 1 second, 3 seconds, and 5 seconds by performing the operation of selecting the radio button for the post-selection setting time. When the user performs the operation on "save" after selecting the radio button, each of the post-display setting time and the post-selection setting time, which are selected, is set.

Configuration of Information Processing Apparatus 10

Hereinafter, a specific configuration of the information processing apparatus 10 will be described.

Figure 9:
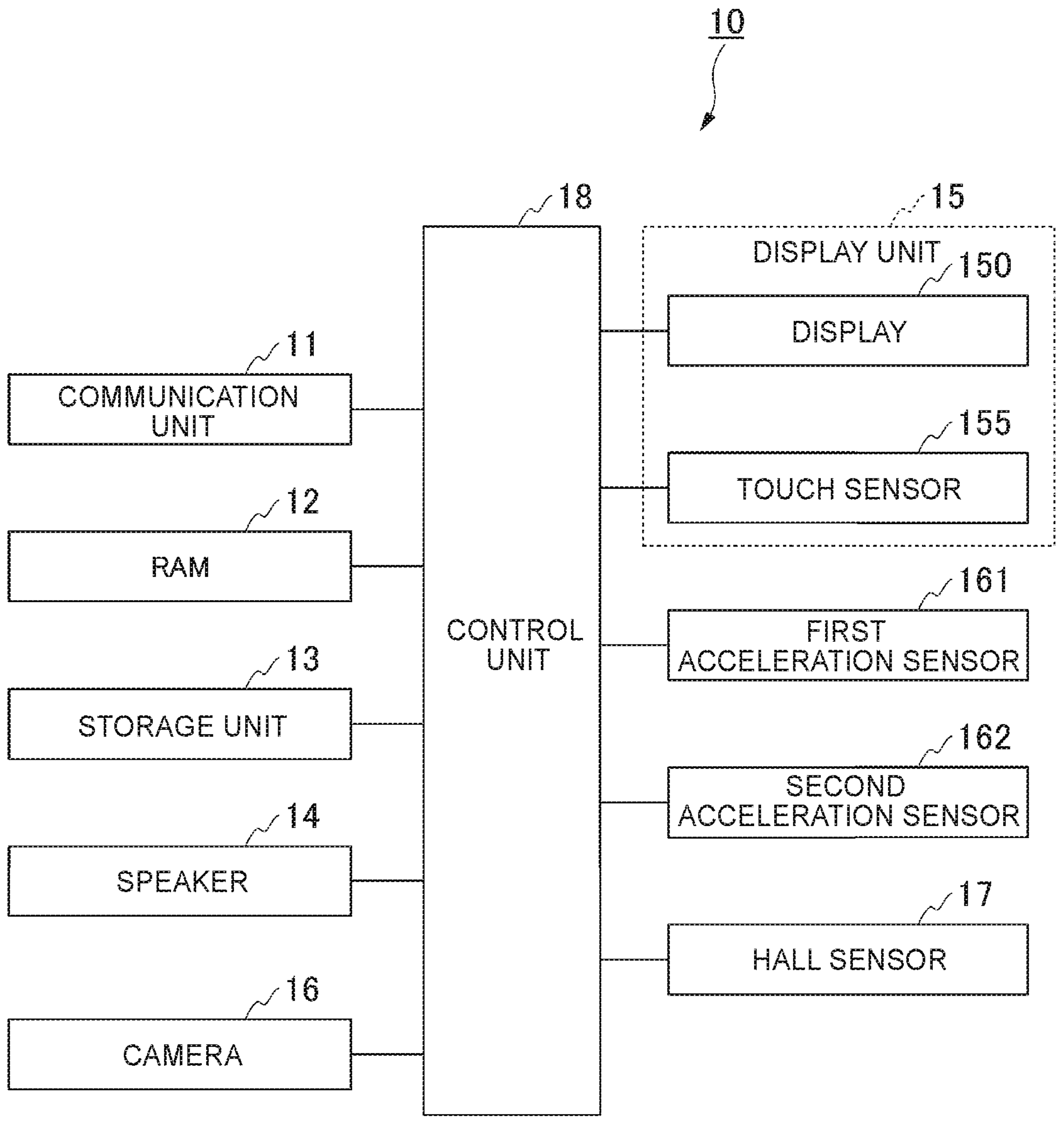
FIG. 9 is a block diagram illustrating a hardware configuration example of the information processing apparatus according to the first embodiment.

FIG. 9 is a block diagram illustrating a hardware configuration example of the information processing apparatus 10 according to the present embodiment. The information processing apparatus 10 is provided with a communication unit 11, a random access memory (RAM) 12, a storage unit 13, a speaker 14, a display unit 15, the camera 16, a first acceleration sensor 161, a second acceleration sensor 162, a hall sensor 17, and a control unit 18. These units are communicably connected to each other via a bus or the like.

The communication unit 11 includes, for example, digital input/output ports such as a plurality of Ethernet (registered trademark) ports or a plurality of universal serial buses (USB), and a communication device that performs wireless communication such as Bluetooth (registered trademark) or Wi-Fi (registered trademark). For example, the communication unit 11 can communicate with the external keyboard 30 or the like described above by using Bluetooth (registered trademark).

A program or data for the process executed by the control unit 18 is loaded in the RAM 12, and various types of data are saved or deleted as appropriate. For example, the RAM 12 also functions as a video memory (V-RAM) that temporarily stores the display data to be displayed on the display 150. As an example, the RAM 12 functions as a video memory of data displayed in the screen area DA when the display 150 is controlled in the one-screen mode. Also, the RAM 12 functions as a video memory of data displayed in the first screen area DA1 and the second screen area DA2 when the display 150 is controlled in the two-screen mode. In addition, the RAM 12 functions as a video memory of data displayed in the first screen area DA1 when the display 150 is controlled in the half-screen mode. It should be noted that, since the RAM 12 is a volatile memory, the data is not held when the supply of power to the RAM 12 is stopped. The data that needs to be held when the supply of power to the RAM 12 is stopped is transferred to the storage unit 13.

The storage unit 13 includes any one or more of a solid state drive (SSD), a hard disk drive (HDD), a read only memory (ROM), a Flash-ROM, and the like. For example, the storage unit 13 saves a program or setting data of a basic input output system (BIOS), a program of an operating system (OS) or an app operating on the OS, various types of data used in the app, and the like.

The speaker 14 outputs an electronic sound, a voice, or the like.

The display unit 15 is provided with the display 150 and a touch sensor 155. As described above, the display 150 is a flexible display that can be bent according to the opening angle θ due to the relative rotational movement of the first chassis 101 and the second chassis 102. The display 150 performs display corresponding to each display mode described with reference to FIG. 4 according to the control of the control unit 18. The touch sensor 155 is provided on the screen of the display 150, and detects the touch operation on the screen. For example, the touch sensor 155 detects the touch operation on the screen area DA in the one-screen mode. In addition, the touch sensor 155 detects the touch operation on one or both of the first screen area DA1 and the second screen area DA2 in the two-screen mode. In addition, the touch sensor 155 detects the touch operation on the first screen area DA1 in the half-screen mode. A tap operation, a slide operation, a flick operation, a swipe operation, a pinch operation, and the like are included in the touch operation. The touch sensor 155 detects the touch operation to output operation information based on the detected operation to the control unit 18.

The camera 16 includes a lens, an imaging element, and the like. The camera 16 captures an image (a still image or a moving image) according to the control of the control unit 18 to output data of the captured image.

The first acceleration sensor 161 is provided inside the first chassis 101, and detects the orientation of the first chassis 101 and the change in the orientation. For example, assuming that a direction parallel to a longitudinal direction of the first screen area DA1 is an X1 direction, a direction parallel to a lateral direction is a Y1 direction, and a direction perpendicular to the X1 direction and the Y1 direction is a Z1 direction, the first acceleration sensor 161 detects acceleration in each of the X1 direction, the Y1 direction, and the Z1 direction to output the detection result to the control unit 18.

The second acceleration sensor 162 is provided inside the second chassis 102, and detects the orientation of the second chassis 102 and the change in the orientation. For example, assuming that a direction parallel to a longitudinal direction of the second screen area DA2 is an X2 direction, a direction parallel to a lateral direction is a Y2 direction, and a direction perpendicular to the X2 direction and the Y2 direction is a Z2 direction, the second acceleration sensor 162 detects acceleration in each of the X2 direction, the Y2 direction, and the Z2 direction to output the detection result to the control unit 18.

The hall sensor 17 is provided to detect whether or not the keyboard 30 is placed. For example, when the keyboard 30 is placed on the second screen area DA2 of the second chassis 102, a magnetic field is changed due to approaching of the magnet provided in the inner portion of the bottom surface of the keyboard 30, and the detection value (output value) of the hall sensor 17 is changed. In other words, the hall sensor 17 outputs different detection results according to whether or not the keyboard 30 is placed.

The control unit 18 includes a processor such as a central processing unit (CPU), a graphic processing unit (GPU), or a microcomputer, and realizes various functions by the processor executing the programs (various programs such as the BIOS, the OS, and the app operating on the OS) stored in the storage unit 13 or the like. For example, the control unit 18 detects the attitude (orientation) of the information processing apparatus 10 based on the detection results of the first acceleration sensor 161 and the second acceleration sensor 162. In addition, the control unit 18 detects, based on the detection results of the first acceleration sensor 161 and the second acceleration sensor 162, whether the information processing apparatus 10 is in the open state or the closed state, and whether the information processing apparatus 10 is in the bent state (bent form) or the flat state (flat form) in a case of the open state, or the like. The control unit 18 detects whether or not the keyboard 30 is placed on the second screen area DA2. Then, the control unit 18 controls the display mode switching illustrated in FIG. 4, based on the attitude (orientation) and the state of the information processing apparatus 10, the presence or absence of the connection with the keyboard 30, and the like, which are detected. In addition, the control unit 18 performs the display control of the display mode selection screen and control of the display time (time until the control of hiding) of the display mode selection screen described with reference to FIGS. 5 to 8.

(Functional Configuration)

Next, in the information processing apparatus 10, a functional configuration of a display mode control process in which the control unit 18 switches the display mode will be described in detail.

Figure 10:
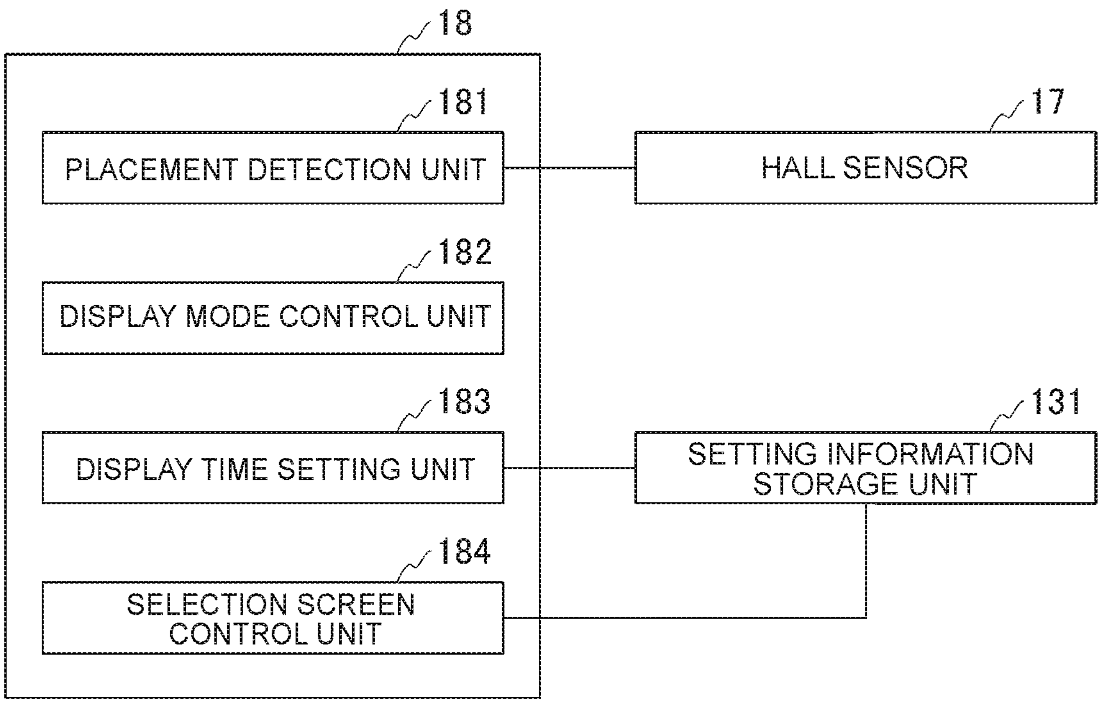
FIG. 10 is a block diagram illustrating a functional configuration example of an information processing apparatus according to the first embodiment.

FIG. 10 is a schematic block diagram illustrating an example of the functional configuration of the information processing apparatus 10 according to the present embodiment. The control unit 18 is provided with a placement detection unit 181, a display mode control unit 182, a display time setting unit 183, and a selection screen control unit 184.

The placement detection unit 181 detects the placement of the keyboard 30 on the second screen area DA2 of the screen area DA of the display 150 based on the detection result by the hall sensor 17. For example, the placement detection unit 181 detects whether or not the keyboard 30 is placed on the second screen area DA2 based on the detection value (output value) of the hall sensor 17.

The display mode control unit 182 performs a display mode switching process of controlling the switching between the display modes illustrated in FIG. 4. For example, the display mode control unit 182 controls the switching to the half-screen mode based on the detection result by the placement detection unit 181. For example, the display mode control unit 182 performs control to the half-screen mode in a case in which the placement of the keyboard 30 is detected by the placement detection unit 181, and performs control to the one-screen mode or the two-screen mode in a case in which the placement of the keyboard 30 is not detected.

The display mode control unit 182 controls the switching between the display modes based on the operation of the user to select the display mode on the display mode selection screen (see FIGS. 5B-5C). In addition, the display mode control unit 182 controls the switching between the display modes based on the attitude (orientation) of the information processing apparatus 10, the state (whether the information processing apparatus 10 is in the bent state (bent form) or the flat state (flat form)), and the like.

The display time setting unit 183 performs a display time setting process of changing the setting of the post-selection setting time (time until the display mode selection screen is hidden after the selection) until the display mode selection screen is controlled to be hidden since the operation of the user to select the display mode is performed on the display mode selection screen, based on a predetermined condition. For example, the display time setting unit 183 displays, on the display 150, the display time setting screen (see FIGS. 7 and 8) on which the post-selection setting time is settable by the user. Then, the display time setting unit 183 changes the setting of the time until the display mode selection screen is hidden after the selection on the condition that the setting of the post-selection setting time is changed, based on the operation of the user on the display time setting screen. The display time setting unit 183 stores the setting of the post-selection setting time in the setting information storage unit 131. The setting information storage unit 131 is, for example, included in the storage unit 13.

In addition, the display time setting unit 183 performs the display time setting process of changing the setting of a post-display setting time (time until the display mode selection screen is hidden after display) until the display mode selection screen is displayed and then controlled to be hidden when there is no user operation after the display mode selection screen is displayed. For example, the display time setting unit 183 displays, on the display 150, the display time setting screen (see FIGS. 7 and 8) on which the post-display setting time is settable by the user. Then, the display time setting unit 183 changes the setting of the time until the display mode selection screen is hidden after display on the condition that the setting of the post-display setting time is changed, based on the operation of the user on the display time setting screen. The display time setting unit 183 stores the setting of the post-display setting time in the setting information storage unit 131.

The selection screen control unit 184 performs a selection screen control process of performing the control to display and hide the display mode selection screen. For example, the selection screen control unit 184 displays, on the display 150, the display mode selection screen (see FIGS. 5B-5C) on which the display mode, which is selectable in the current display mode, can be selected based on the operation of the user. For example, in a case in which the user performs the operation of displaying the display mode selection screen (for example, the operation on the icon C1 illustrated in FIG. 5A), the selection screen control unit 184 displays the display mode selection screen on the display 150.

It should be noted that the selection screen control unit 184 may display, on the display 150, the display mode selection screen in a case in which the orientation of the information processing apparatus 10 is changed or in a case in which the state (the bent state (bent form), the flat state (flat form), or the like) of the information processing apparatus 10 is changed.

Then, in a case in which the operation of the user to select the display mode is performed on the display mode selection screen, the selection screen control unit 184 controls the displayed display mode selection screen to be hidden after the predetermined time elapses since the operation is performed. For example, the selection screen control unit 184 controls the display mode selection screen to be hidden, after the post-selection setting time elapses since the operation of the user to select the display mode, by using the post-selection setting time stored in the setting information storage unit 131 as the predetermined time.

In addition, in a case in which the operation of the user to select the display mode is performed on the display mode selection screen is not performed, the selection screen control unit 184 controls the display mode selection screen to be hidden, after the post-display setting time stored in the setting information storage unit 131 has elapsed.

(Operation of Display Mode Selection Screen Control Process)

Next, an operation of a display control process in which the control unit 18 controls display of the display mode selection screen will be described.

Figure 11:
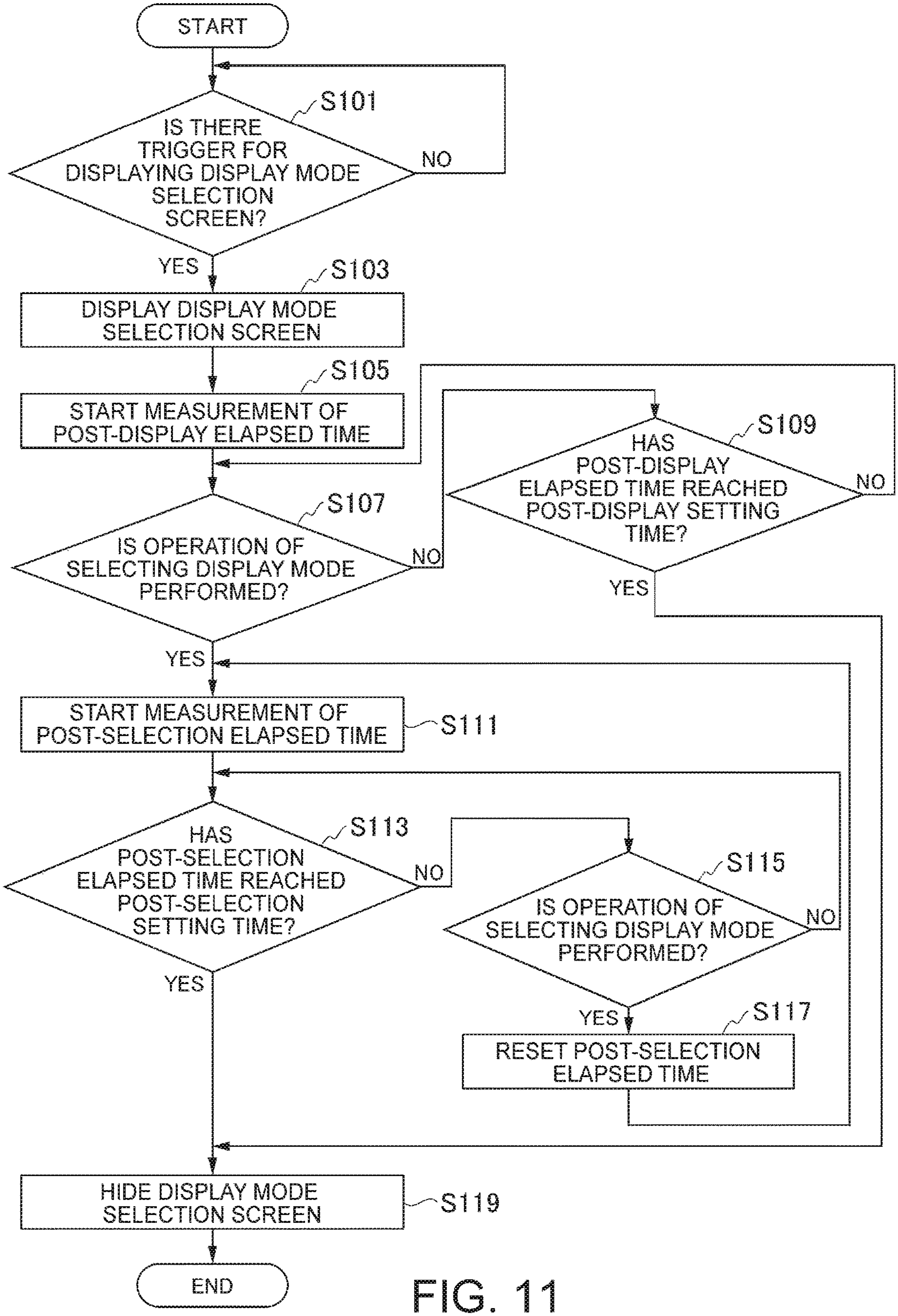
FIG. 11 is a flowchart illustrating an example of a display control process of the display mode selection screen according to the first embodiment.

FIG. 11 is a flowchart illustrating an example of the display control process on the display mode selection screen according to the present embodiment.

(Step S101) The control unit 18 determines whether or not there is a trigger for displaying the display mode selection screen. For example, in a case in which the user performs the operation of displaying the display mode selection screen (for example, the operation on the icon C1 illustrated in FIG. 5A), the control unit 18 determines that there is the trigger for displaying the display mode selection screen on the display 150. It should be noted that the control unit 18 may determine that there is the trigger for displaying the display mode selection screen on the display 150 in a case in which the orientation of the information processing apparatus 10 is changed or in a case in which the state (the bent state (bent form), the flat state (flat form), or the like) of the information processing apparatus 10 is changed. In a case in which there is no trigger for displaying the display mode selection screen on the display 150 (NO), the control unit 18 performs the process of step S101 again. On the other hand, in a case in which the control unit 18 determines that there is the trigger for displaying the display mode selection screen on the display 150 (YES), the control unit 18 proceeds to the process of step S103.

(Step S103) The control unit 18 displays the display mode selection screen (for example, the pop-up screen) on the display 150 (see FIGS. 5B-5C and FIG. 6A). The control unit 18 proceeds to the process of step S105.

(Step S105) The control unit 18 starts measurement of a post-display elapsed time since the display mode selection screen is displayed in step S103. The control unit 18 proceeds to the process of step S107.

(Step S107) The control unit 18 determines whether or not the operation of selecting the display mode is performed on the display mode selection screen. In a case in which the control unit 18 determines that the operation of selecting the display mode is not performed (NO), the control unit 18 proceeds to the process of step S109. On the other hand, in a case in which the user performs the operation of selecting the display mode on the display mode selection screen, the control unit 18 determines that the operation of selecting the display mode is performed (YES), and proceeds to the process of step S111.

(Step S109) The control unit 18 determines whether or not the post-display elapsed time for which the measurement is started in step S105 has reached the post-display setting time (time until the display mode selection screen is hidden after display). The post-display setting time is set, for example, based on the operation of the user on the display time setting screen (see FIGS. 7 and 8), and stored in the setting information storage unit 131. In a case in which the control unit 18 determines that the post-display elapsed time has not reached the post-display setting time (NO), the control unit 18 returns to the process of step S107. On the other hand, in a case in which the control unit 18 determines that the post-display elapsed time has reached the post-display setting time (YES), the control unit 18 controls the display mode selection screen displayed in step S103 to be hidden (step S119).

(Step S111) The control unit 18 starts measurement of a post-selection elapsed time since the operation of the user to select the display mode is performed on the display mode selection screen (since it is determined in step S107 that the operation of selecting the display mode is performed). The control unit 18 proceeds to the process of step S113.

(Step S113) The control unit 18 determines whether or not the post-selection elapsed time for which the measurement is started in step S111 has reached the post-selection setting time (time until the display mode selection screen is hidden after the selection). The post-selection setting time is set, for example, based on the operation of the user on the display time setting screen (see FIGS. 7 and 8), and stored in the setting information storage unit 131. For example, the post-selection setting time is 0.5 seconds in an initial value, but can be changed by the user to a time (for example, 3 seconds) longer than the initial value such that the display mode can be reselected after the selection. In a case in which the control unit 18 determines that the post-selection elapsed time has not reached the post-selection setting time (NO), the control unit 18 proceeds to the process of step S115. On the other hand, in a case in which the control unit 18 determines that the post-selection elapsed time has reached the post-selection setting time (YES), the control unit 18 controls the display mode selection screen displayed in step S103 to be hidden (step S119).

(Step S115) The control unit 18 determines whether or not the operation of selecting the display mode is performed on the display mode selection screen. In a case in which the control unit 18 determines that the operation of selecting the display mode is not performed (NO), the control unit 18 returns to the process of step S113, and determines whether or not the post-selection elapsed time has reached the post-selection setting time. On the other hand, in a case in which the user performs the operation of selecting the display mode on the display mode selection screen, the control unit 18 determines that the operation of selecting the display mode is performed (YES), and proceeds to the process of step S117.

(Step S117) The control unit 18 cancels the measurement and resets the post-selection elapsed time. Then, the control unit 18 returns to the process of step S111, and the control unit 18 starts the measurement of the post-selection elapsed time since it is determined in step S115 that the operation of selecting the display mode is performed.

Then, the control unit 18 determines whether or not the post-selection elapsed time since it is determined in step S115 that the operation of selecting the display mode is performed has reached the post-selection setting time (step S113), and in a case in which it is determined that the post-selection elapsed time has reached the post-selection setting time (step S113: YES), controls the display mode selection screen displayed in step S103 to be hidden (step S119).

Summary of First Embodiment

As described above, the information processing apparatus 10 according to the present embodiment includes the display 150, the RAM 12 (an example of a memory) that temporarily stores the display data to be displayed on the display 150, and the control unit 18 (for example, an example of a configuration including any processor such as a CPU, a GPU, or a microcomputer) that performs control when the display data stored in the RAM 12 is displayed on the display 150. The control unit 18 performs the display mode switching process of switching between the one-screen mode (an example of a first display mode) in which display is controlled by using the entire screen area DA of the display 150 as the display area, and the two-screen mode (an example of a second display mode) in which display is controlled by dividing the screen area DA into a plurality of areas (for example, two areas). In addition, the control unit 18 performs the selection screen control process of displaying, on the display 150, the display mode selection screen (an example of a selection screen, see FIGS. 5B-5C) on which any display mode of the one-screen mode and the two-screen mode is selectable by the operation of the user, and controlling the display mode selection screen to be hidden, after the predetermined time elapses since the operation of the user to select the display mode is performed on the display mode selection screen (for example, in a case in which the post-selection elapsed time has reached the post-selection setting time). In addition, the control unit 18 performs the display time setting process of changing the setting of the predetermined time (for example, the post-selection setting time) based on the predetermined condition.

As a result, the information processing apparatus 10 can change the post-selection setting time until the display mode selection screen is controlled to be hidden since the operation of the user to select the display mode (for example, any one of the one-screen mode or the two-screen mode), so that the operability when the display modes of the display 150 are switched can be improved.

For example, in the display time setting process, the control unit 18 displays, on the display 150, the display time setting screen (an example of a setting screen, see FIGS. 7 and 8) on which the post-selection setting time is settable by the user, and changes the setting of the post-selection setting time by using, as the predetermined condition, the fact that the setting of the post-selection setting time is changed based on the operation of the user on the display time setting screen.

As a result, the information processing apparatus 10 enables the user to change, to an appropriate time, the post-selection setting time until the display mode selection screen is controlled to be hidden since the operation of the user to select the display mode, so that the operability when the display modes of the display 150 are switched can be improved.

In addition, in the display mode switching process, in the two-screen mode, the control unit 18 controls display by dividing the screen area DA of the display 150 into two display areas, the first screen area DA1 and the second screen area DA2, and performs the switching even to the display mode in which the display data to be displayed in the first screen area DA1 and the display data to be displayed in the second screen area DA2 are switched.

As a result, the information processing apparatus 10 enables the user to easily switch the primary screen and the secondary screen in the two-screen mode, in addition to switching between the one-screen mode and the two-screen mode.

A control method in the information processing apparatus 10 according to the present embodiment includes causing the control unit 18 (for example, an example of a configuration including any processor such as a CPU, a GPU, or a microcomputer) to perform a step of switching between the one-screen mode (an example of a first display mode) in which display is controlled by using the entire screen area DA of the display 150 as the display area and the two-screen mode (an example of a second display mode) in which display is controlled by dividing the screen area DA into a plurality of areas (for example, two areas), a step of displaying, on the display 150, the display mode selection screen (an example of a selection screen, see FIG. 5B-5C) on which any display mode of the one-screen mode and the two-screen mode is selectable by the operation of the user, a step of controlling the display mode selection screen to be hidden, after the predetermined time elapses since the operation of the user to select the display mode is performed on the display mode selection screen (for example, in a case in which the post-selection elapsed time has reached the post-selection setting time), and a step of changing the setting of the predetermined time (for example, the post-selection setting time) based on the predetermined condition.

As a result, in the control method in the information processing apparatus 10, it is possible to change the post-selection setting time until the display mode selection screen is controlled to be hidden since the operation of the user to select the display mode (for example, any one of the one-screen mode or the two-screen mode), so that the operability when the display modes of the display 150 are switched can be improved.

Second Embodiment

Hereinafter, a second embodiment will be described.

In the first embodiment, the configuration in which the user can change the post-selection setting time until the display mode selection screen is controlled to be hidden since the operation of the user to select the display mode is performed on the display mode selection screen has been described. In the present embodiment, a configuration in which the post-selection setting time is changed under a condition based on an operation history for each user will be described.

For example, even in a case in which the post-selection setting time is set to a time longer than the initial value (for example, 0.5 seconds) such as 1 second or 3 seconds by the user, a state in which the user does not reselect the display mode after selecting the display mode may continue for a certain period or more. In such a case, the control unit 18 (display time setting unit 183) may change the post-selection setting time to a time shorter than the initial value (for example, 0.5 seconds). In addition, in a case in which the post-selection setting time is not changed from the initial value (for example, 0.5 seconds) but the user frequently reselects the display mode after selecting the display mode, the control unit 18 (display time setting unit 183) may change the post-selection setting time to a time (for example, 1 second or 3 seconds) longer than the initial value (0.5 seconds).

For example, the control unit 18 saves, the setting profile, the operation history (operation history of the operation of selecting the display mode) of the user on the display mode selection screen in association with each user (each identification information of the user), and changes the post-selection setting time based on the setting profile.

As described above, in the information processing apparatus 10 according to the present embodiment, in the display time setting process of changing the setting of the post-selection setting time based on the predetermined condition, the control unit 18 changes the setting of the post-selection setting time by using, as the predetermined condition, the condition based on the operation history (setting profile) of the user on the display mode selection screen.

As a result, the information processing apparatus 10 enables the user to automatically change, to an appropriate time according to the operation history for each user, the post-selection setting time until the display mode selection screen is controlled to be hidden since the operation of the user to select the display mode, based on the operation history for each user on the display mode selection screen, so that the operability when the display modes of the display 150 are switched can be improved.

It should be noted that the control unit 18 may automatically change the post-selection setting time to an appropriate post-selection setting time for each user by performing the machine learning based on the operation history (setting profile) for each user on the display mode selection screen.

Figure 12:
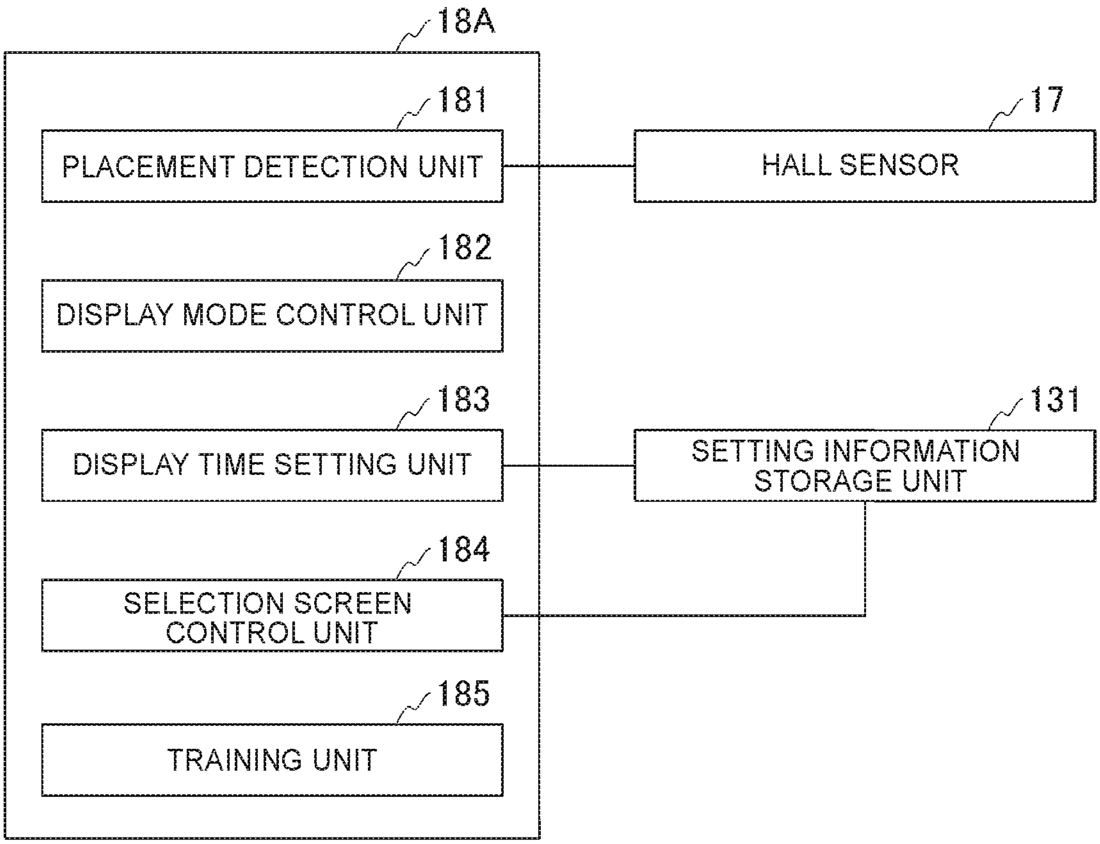
FIG. 12 is a block diagram illustrating a functional configuration example in which machine learning of an information processing apparatus according to the second embodiment is performed.

FIG. 12 is a schematic block diagram illustrating an example of a functional configuration of the information processing apparatus 10 according to the present embodiment in which the machine learning is performed. In FIG. 12, the configuration corresponding to each unit of FIG. 10 is denoted by the same reference numeral. A control unit 18A is provided with the placement detection unit 181, the display mode control unit 182, the display time setting unit 183, the selection screen control unit 184, and a training unit 185, and is different from the control unit 18 in FIG. 10 in that the training unit 185 is provided.

The training unit 185 performs the machine learning based on the input data to generate a trained model. For example, the training unit 185 performs the machine learning by using the operation history (setting profile) for each user on the display mode selection screen as an input data set, to generate the trained model for each user.

In the display time setting process, the control unit 18A changes the setting of the post-selection setting time by using the trained model subjected to the machine learning based on the operation history for each user on the display mode selection screen.

As a result, the information processing apparatus 10 can automatically change the post-selection setting time to the appropriate post-selection setting time according to the operation history for each user by performing the machine learning based on the operation history for each user on the display mode selection screen, so that the operability when the display modes of the display 150 are switched can be improved.

It should be noted that the information processing apparatus 10 may display information for prompting to change the post-selection setting time on the display 150 and allow the user to change the post-selection setting time by himself or herself, instead of automatically changing the setting of the post-selection setting time based on the operation history for each user on the display mode selection screen.

For example, in the display time setting process, the control unit 18 (18A) displays, on the display 150, the information for prompting to change the post-selection setting time based on the condition based on the operation history for each user on the display mode selection screen. Further, in a case in which the user who views the information for prompting to change performs the operation of display the display time setting screen, the control unit 18 (18A) displays, on the display 150, the display time setting screen (see FIGS. 7 and 8) on which the post-selection setting time is settable by the user based on the operation of the user. Then, the control unit 18 (18A) changes the setting of the post-selection setting time on the condition that the setting of the post-selection setting time is changed, based on the operation of the user on the display time setting screen.

As a result, the information processing apparatus 10 enables the user to set the appropriate post-selection setting time because the user is prompted to change the post-selection setting time to the appropriate post-selection setting time according to the operation history for each user based on the operation history for each user on the display mode selection screen, so that the operability when the display modes of the display 150 are switched can be improved.

Third Embodiment

Hereinafter, a third embodiment will be described.

In the present embodiment, a configuration in which the post-selection setting time is changed under a condition based on a time zone will be described.

The user may be likely to select the wrong display mode according to the time zone (for example, evening or late night). In a case in which the wrong display mode is selected, the user frequently reselects the display mode after selecting the display mode, and thus the control unit 18 (display time setting unit 183) may change the post-selection setting time to a time (for example, 1 second or 3 seconds) longer than the initial value (0.5 seconds).

For example, in the display time setting process of changing the setting of the post-selection setting time based on the predetermined condition, the control unit 18 changes the setting of the post-selection setting time by using, as the predetermined condition, the condition based on the time zone.

As a result, the information processing apparatus 10 can automatically change, to an appropriate time, the post-selection setting time until the display mode selection screen is controlled to be hidden since the operation of the user to select the display mode, according to the time zone, so that the operability when the display modes of the display 150 are switched can be improved.

It should be noted that the control unit 18 may automatically change the post-selection setting time to the appropriate post-selection setting time of the user according to the time zone by performing the machine learning based on the time zone and the operation history (setting profile) of the user on the display mode selection screen.

For example, in the functional configuration of the information processing apparatus 10 illustrated in FIG. 12, the training unit 185 provided in the control unit 18A performs the machine learning by using the time zone and the operation history (setting profile) for each user on the display mode selection screen as the input data set, to generate the trained model.

In the display time setting process, the control unit 18A changes the setting of the post-selection setting time by using the trained model subjected to the machine learning based on the time zone and the operation history of the user on the display mode selection screen.

As a result, the information processing apparatus 10 can automatically change the post-selection setting time to the appropriate post-selection setting time according to the time zone, and thus the operability when the display modes of the display 150 are switched can be improved.

It should be noted that the information processing apparatus 10 may display information for prompting to change the post-selection setting time on the display 150 according to the time zone and allow the user to change the post-selection setting time by himself or herself, instead of automatically changing the setting of the post-selection setting time based on the time zone.

For example, in the display time setting process, the control unit 18 (18A) displays, on the display 150, the information for prompting to change the post-selection setting time based on the condition based on the time zone. Further, in a case in which the user who views the information for prompting to change performs the operation of display the display time setting screen, the control unit 18 (18A) displays, on the display 150, the display time setting screen (see FIGS. 7 and 8) on which the post-selection setting time is settable by the user based on the operation of the user. Then, the control unit 18 (18A) changes the setting of the post-selection setting time on the condition that the setting of the post-selection setting time is changed, based on the operation of the user on the display time setting screen.

As a result, the information processing apparatus 10 prompts the user to change the post-selection setting time to the appropriate post-selection setting time according to the time zone, so that the user can set the appropriate post-selection setting time, and the operability when the display modes of the display 150 are switched can be improved.

Fourth Embodiment

Hereinafter, a fourth embodiment will be described.

In the present embodiment, a configuration in which the post-selection setting time is changed under a condition based on a type of an application being used will be described.

According to the type of the application, there may be an application that wants to change the display mode according to a display magnification or the like, or an application that wants to switch between the display modes during use. In addition, in a case in which a plurality of applications are being executed, it may be difficult to determine which display mode is appropriate. In such a case, since there is a possibility that the user reselects the display mode after selecting the display mode, the control unit 18 (display time setting unit 183) may change the post-selection setting time to a time (for example, 1 second or 3 seconds) longer than the initial value (0.5 seconds) based on the type of the application being used.

Here, the type of application being used may be any of a title, a version, a genre, and the like of the application.

For example, in the display time setting process of changing the setting of the post-selection setting time based on the predetermined condition, the control unit 18 changes the setting of the post-selection setting time by using, as the predetermined condition, the condition based on the type of the application being used.

As a result, the information processing apparatus 10 can automatically change, to an appropriate time, the post-selection setting time until the display mode selection screen is controlled to be hidden since the operation of the user to select the display mode, according to the type of the application being used, so that the operability when the display modes of the display 150 are switched can be improved.

It should be noted that the control unit 18 may automatically change the post-selection setting time to the appropriate post-selection setting time for each user according to the type of the application being used by performing the machine learning based on the type of the application being used and the operation history (setting profile) of the user on the display mode selection screen.

For example, in the functional configuration of the information processing apparatus 10 illustrated in FIG. 12, the training unit 185 provided in the control unit 18A performs the machine learning by using the type of the application being used and the operation history (setting profile) for each user on the display mode selection screen as the input data set, to generate the trained model.

In the display time setting process, the control unit 18A changes the setting of the post-selection setting time by using the trained model subjected to the machine learning based on the type of the application being used and the operation history of the user on the display mode selection screen.

As a result, the information processing apparatus 10 can automatically change the post-selection setting time to the appropriate post-selection setting time according to the type of the application being used, and thus the operability when the display modes of the display 150 are switched can be improved.

It should be noted that the information processing apparatus 10 may display the information for prompting to change the post-selection setting time on the display 150 according to the type of the application being used and allow the user to change the post-selection setting time by himself or herself, instead of automatically changing the setting of the post-selection setting time based on the type of the application being used.

For example, in the display time setting process, the control unit 18 (18A) displays, on the display 150, the information for prompting to change the post-selection setting time based on the condition based on the type of the application being used. Further, in a case in which the user who views the information for prompting to change performs the operation of display the display time setting screen, the control unit 18 (18A) displays, on the display 150, the display time setting screen (see FIGS. 7 and 8) on which the post-selection setting time is settable by the user based on the operation of the user. Then, the control unit 18 (18A) changes the setting of the post-selection setting time on the condition that the setting of the post-selection setting time is changed, based on the operation of the user on the display time setting screen.

As a result, the information processing apparatus 10 prompts the user to change the post-selection setting time to the appropriate post-selection setting time according to the type of the application being used, so that the user can set the appropriate post-selection setting time, and the operability when the display modes of the display 150 are switched can be improved.

Although the embodiments of the present invention have been described above in detail with reference to the accompanying drawings, a specific configuration is not limited to the above-described configuration, and various design changes and the like can be made without departing from the gist of the present invention. For example, the configurations described in the above-described embodiments may be optionally combined.

In the above-described embodiments, the example of the one-screen mode (an example of a first display mode) in which display is controlled by using the screen area of the display 150 as one screen area DA and the two-screen mode (an example of a second display mode) in which display is controlled by dividing the screen area into the two screen areas, the first screen area DA1 and the second screen area DA2, has been described, but the present invention is not limited to the division into the two screen areas in a case in which the screen area of the display 150 is divided, and the screen area may be divided into three or more display areas.

In addition, in the above-described embodiments, the example has been described in which the information processing apparatus 10 is provided with one foldable display 150, but a plurality of displays may be provided. For example, a configuration may be adopted in which the information processing apparatus 10 is provided with a total of two displays, one display on each of the inner surface of the first chassis 101 and one display on the inner surface of the second chassis 102. In a case of a configuration in which two displays are provided, a configuration may be adopted in which the one-screen mode (an example of a first display mode) in which display is controlled by using the entire screen areas of the two displays as one display area and the two-screen mode (an example of a second display mode) in which display is controlled by dividing the screen areas of the two displays into the two areas (for example, the first screen area DA1 and the second screen area DA2) are switched.

In the above-described embodiments, the example of the touch operation on the plurality of touch panel type displays in which the input unit (touch sensor) and the display unit are integrally configured has been described, but the present invention is not limited to the touch operation, and a click operation using a mouse, an operation using a gesture, or the like may be performed.

It should be noted that the information processing apparatus 10 described above has a computer system inside. The process in each configuration of the information processing apparatus 10 described above may be performed by recording a program for realizing the function of each configuration of the information processing apparatus 10 described above on a computer-readable recording medium, and reading the program recorded on the recording medium with the computer system to execute the program. Here, "reading the program recorded on the recording medium into the computer system to execute the program" includes installing the program in the computer system. The "computer system" herein includes the OS or hardware such as peripheral devices. In addition, the "computer system" may include a plurality of computer apparatuses connected via a network including a communication line such as the Internet, a WAN, a LAN, or a dedicated line. In addition, the "computer-readable recording medium" is a portable medium such as a flexible disk, a magneto-optical disk, a ROM, or a CD-ROM, and a storage device such as a hard disk built in the computer system. As described above, the recording medium that stores the program may be a non-transitory recording medium such as a CD-ROM.

In addition, the recording medium also includes an internal or external recording medium that can be accessed from a distribution server to distribute the program. It should be noted that a configuration may be used in which the program is divided into a plurality of programs, downloaded at different timings, and then combined with each configuration of the information processing apparatus 10, or distribution servers for distributing the respective divided programs may be different. Further, the "computer-readable recording medium" includes a medium, which holds the program for a certain period of time, such as a volatile memory (RAM) inside the computer system that serves as a server or a client in a case in which the program is transmitted via the network. The above-described program may be a program for realizing a part of the above-described functions. Further, the program may be a so-called difference file (difference program) in which the above-described functions can be realized in combination with the program already recorded in the computer system.

A part or all of the functions of the information processing apparatus 10 in the above-described embodiments may be realized by an integrated circuit such as a large scale integration (LSI). Each of the functions may be individually realized as a processor, and a part or all of the functions may be integrated into a processor. A method of achieving the integrated circuit is not limited to the LSI, and may be realized by a dedicated circuit or a general-purpose processor. In a case in which advances in a semiconductor technique lead to appearance of an integrated circuit technique that replaces the LSI, an integrated circuit based on the technique may be used.

DESCRIPTION OF SYMBOLS

10 information processing apparatus
101 first chassis
102 second chassis
103 hinge mechanism
11 communication unit
12 RAM

13 storage unit
14 speaker
15 display unit
16 camera
150 display
155 touch sensor
161 first acceleration sensor
162 second acceleration sensor
17 hall sensor
18, 18A control unit
181 placement detection unit
182 display mode control unit
183 display time setting unit
184 selection screen control unit
185 training unit
30 keyboard

What is claimed is:

1. An information processing apparatus comprising:

a display;

a memory configured to temporarily store display data to be displayed on the display; and a processor configured to perform control when the display data stored in the memory is displayed on the display, wherein the processor is configured to:

perform a display mode switching process of switching between a first display mode in which display is controlled by using an entire screen area of the display as a display area, and a second display mode in which display is controlled by dividing the entire screen area into a plurality of areas, perform a selection screen control process of displaying, on the display, a selection screen on which any display mode of the first display mode and the second display mode is selectable by an operation of a user, and controlling the selection screen to be hidden, after a predetermined time elapses since the operation of the user to select the display mode is performed on the selection screen, perform a display time setting process of changing a setting of the predetermined time based on a predetermined condition, and in the display time setting process, change the setting of the predetermined time by using, as the predetermined condition, a condition based on an operation history for each user on the selection screen.

2. The information processing apparatus according to claim 1, wherein the processor is configured to:

in the display time setting process, display, on the display, a setting screen on which the predetermined time is settable by the user, and change the setting of the predetermined time by using, as the predetermined condition, a fact that the setting of the predetermined time is changed based on an operation of the user on the setting screen.

3. The information processing apparatus according to claim 1, wherein the processor is configured to:

in the display time setting process, change the setting of the predetermined time by using a trained model subjected to machine learning based on the operation history for each user on the selection screen.

4. The information processing apparatus according to claim 1, wherein the processor is configured to:

in the display time setting process, change the setting of the predetermined time by using, as the predetermined condition, a condition based on a time zone.

5. The information processing apparatus according to claim 4, wherein the processor is configured to:

in the display time setting process, change the setting of the predetermined time by using a trained model subjected to machine learning based on the time zone and an operation history of the user on the selection screen.

6. The information processing apparatus according to claim 1, wherein the processor is configured to:

in the display time setting process, change the setting of the predetermined time by using, as the predetermined condition, a condition based on a type of an application being used.

7. The information processing apparatus according to claim 6, wherein the processor is configured to:

in the display time setting process, change the setting of the predetermined time by using a trained model subjected to machine learning based on the type of the application being used and an operation history of the user on the selection screen.

8. The information processing apparatus according to claim 1, wherein the processor is configured to:

in the display time setting process, display, on the display, information for prompting to change the predetermined time based on the predetermined condition, and display, on the display, a setting screen on which the predetermined time is settable by the user based on an operation of the user; and change the setting of the predetermined time by using, as the predetermined condition, a fact that the setting of the predetermined time is changed based on the operation of the user on the setting screen.

9. The information processing apparatus according to claim 1, wherein the processor is configured to:

in the display mode switching process, in the second display mode, control display by dividing the screen area of the display into two display areas, a first screen area and a second screen area, and perform switching even to a display mode in which display data to be displayed in the first screen area and display data to be displayed in the second screen area are switched.

10. A control method in an information processing apparatus including a display, a memory configured to temporarily store display data to be displayed on the display, and a processor configured to perform control when the display data stored in the memory is displayed on the display, the control method comprising:

causing the processor to:

perform a step of switching between a first display mode in which display is controlled by using an entire screen area of the display as a display area and a second display mode in which display is controlled by dividing the entire screen area into a plurality of areas, perform a step of displaying, on the display, a selection screen on which any display mode of the first display mode and the second display mode is selectable by an operation of a user, perform a step of controlling the selection screen to be hidden, after a predetermined time elapses since the operation of the user to select the display mode is performed on the selection screen, perform a step of changing a setting of the predetermined time based on a predetermined condition, and in the display time setting process, change the setting of the predetermined time by using, as the predetermined condition, a condition based on an operation history for each user on the selection screen.

* * * * *